US012045050B2

(12) United States Patent
Benda et al.

(10) Patent No.: US 12,045,050 B2
(45) Date of Patent: Jul. 23, 2024

(54) GESTURING FOR CONTROL INPUT FOR A VEHICLE

(71) Applicant: Superior Marine LLC, Hancock, MI (US)

(72) Inventors: Nels E. Benda, Hancock, MI (US); Austin K. Erva, Belleair Bluffs, FL (US); Zachary R. Erkkila, Larium, MI (US)

( * ) Notice: Subject to any disclaimer, the term of this patent is extended or adjusted under 35 U.S.C. 154(b) by 240 days.

(21) Appl. No.: 17/390,463

(22) Filed: Jul. 30, 2021

(65) Prior Publication Data

US 2021/0356957 A1 Nov. 18, 2021

Related U.S. Application Data

(63) Continuation-in-part of application No. 16/246,897, filed on Jan. 14, 2019, now Pat. No. 11,079,751.

(60) Provisional application No. 62/616,892, filed on Jan. 12, 2018.

(51) Int. Cl.
*G05D 1/00* (2024.01)

(52) U.S. Cl.
CPC ......... *G05D 1/0016* (2013.01); *G05D 1/0038* (2013.01); *G05D 1/10* (2013.01)

(58) Field of Classification Search
CPC .. G05D 1/0011; G05D 1/0016; G05D 1/0038; G05D 1/0044; G05D 1/10; G06F 3/017
See application file for complete search history.

(56) References Cited

U.S. PATENT DOCUMENTS

| 9,751,607 | B1 | 9/2017 | Kollmann et al. | |
|---|---|---|---|---|
| 2014/0008496 | A1 | 1/2014 | Ye et al. | |
| 2017/0192518 | A1* | 7/2017 | Hygh | A63F 13/28 |
| 2018/0136659 | A1* | 5/2018 | Matloff | H04N 23/60 |
| 2019/0137993 | A1 | 5/2019 | Bertrand et al. | |
| 2019/0187692 | A1* | 6/2019 | Kim | G06F 3/038 |
| 2020/0272144 | A1* | 8/2020 | Yang | G05D 1/101 |
| 2020/0387238 | A1* | 12/2020 | Parazynski | G08B 5/36 |
| 2021/0041878 | A1* | 2/2021 | Seifert | G05D 1/0016 |

OTHER PUBLICATIONS

European Search report. Reference-P1127EP00, Application No. 19151732.5-1216, Date:Apr. 15, 2019.
Julian Seifert, PointerPhone:Using Mobile Phones for Direct Pointing Interactions with Remote Displays, 2013, pp. 18-35, Interact 2013.

* cited by examiner

*Primary Examiner* — Aaron L Troost
(74) *Attorney, Agent, or Firm* — DEVICE PATENT LLC

(57) ABSTRACT

Disclosed is a method for providing input to a vehicle control system to navigate, position and direct a vehicle, by use of a gesture sensing device. The gesture sensing device may be in the form of: a remote, a mobile computing device such as a smartphone, a tablet or smart-watch, or a direction/motion sensor. The vehicle control system with gesture sensing device is useful for the control of radio controlled vehicles, drones and driver and driverless vehicles. In preferred embodiments, the vehicle control system with gesture sensing device is used to control GNSS/GPS enabled electric steer trolling motors, such as motors utilizing the Pro-Nav® Angler, Rhodan® HD GPS® Anchor, Minn-Kota® IPilot, and the MotorGuide® Pinpoint.

20 Claims, 16 Drawing Sheets

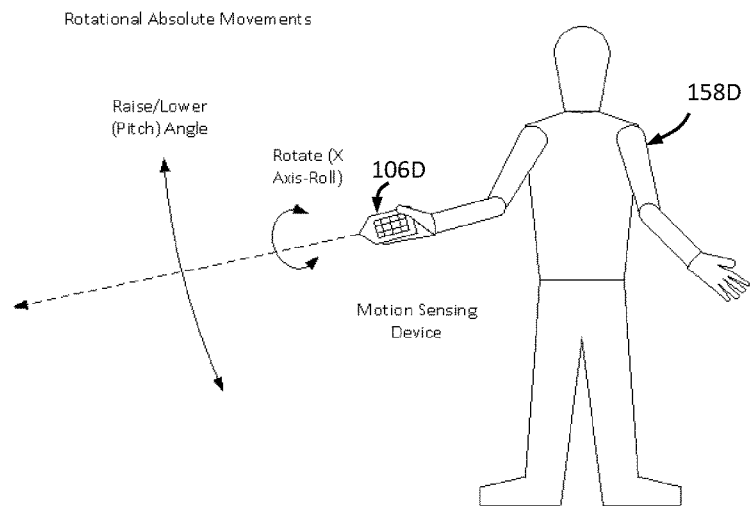
FIGURE 5
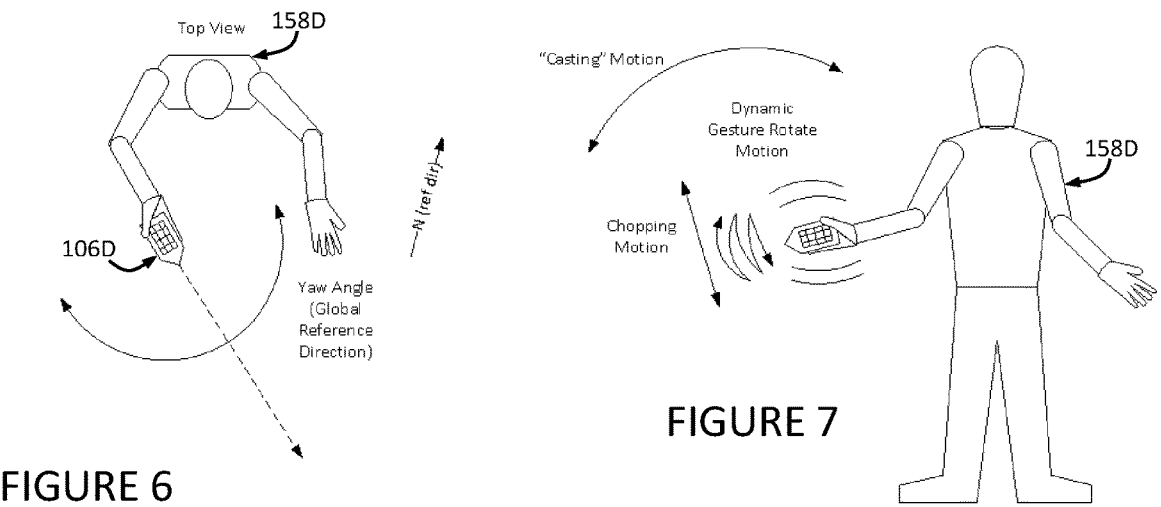
FIGURE 6
FIGURE 7
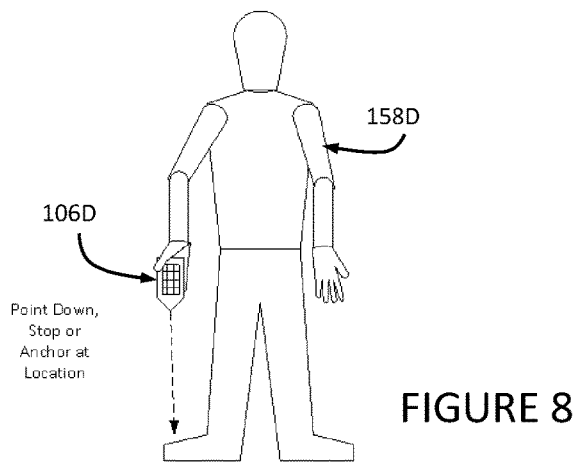
FIGURE 8

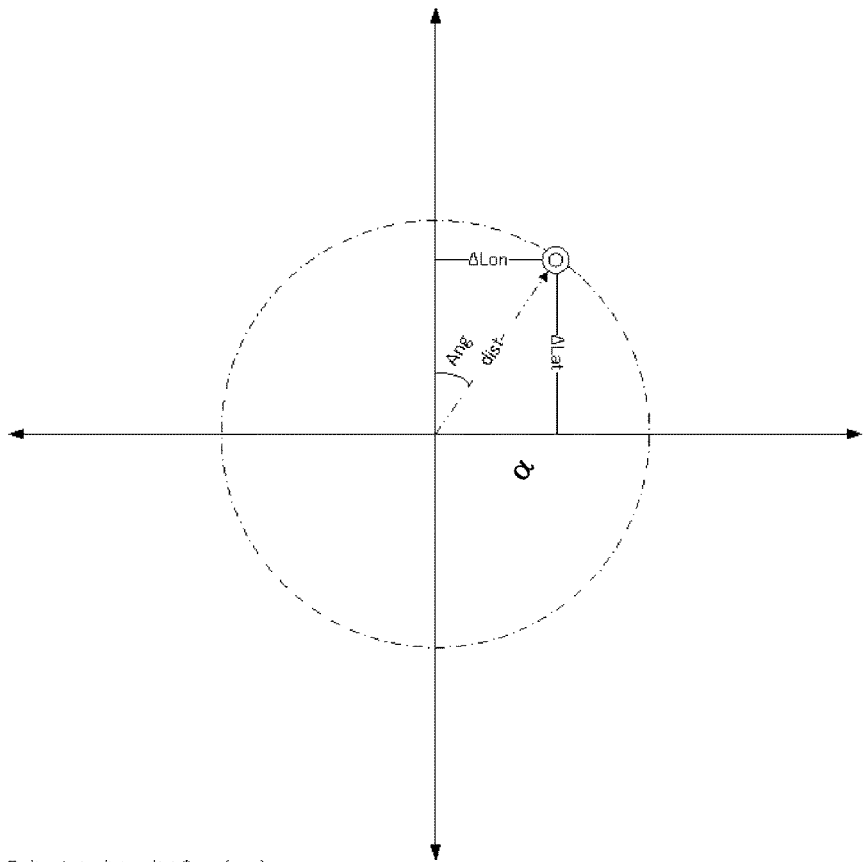

Delta_Lat_dist = dist * cos(ang);
Delta_lat_deg = Delta_Lat_dist / 1.11E5
Delta_Lon_dist = (dist/cos(lat)) * sin(ang)
Delta_Lon_deg = Delta_Lon_dist / (1.11E5 * (cos(lat)))

FIGURE 9

Anchor Distance Calculation

| The motion is: (Operational Mode) | When the Current Command is: Anchor | Vector | Compass Heading | Routes | Manual | Reversion |
|---|---|---|---|---|---|---|
| Point in a Direction | Adjusts the Point in Said Direction | Adjusts the Desired Heading in Said Direction from Current Absolute Position | Adjusts the Desired Heading in Said Direction | No Action | Drive in a particular direction - This would point the thruster to match the GSD | Same as Manual |
| Roll Angle | Flatter Angle equates to shorter jog, more roll indicates longer jog | Adjusts the speed, similar to a tiller throttle on a tiller steer motor, this would adjust speed based on angle | Adjusts the speed, similar to a tiller throttle on a tiller steer motor, this would adjust speed based on angle | No Action | Adjusts the speed, similar to a tiller throttle on a tiller steer motor, this would adjust speed based on angle | Same as Manual |

FIGURE 10

Anchor Mode Overview

Anchor Jog Flow

Manual Drive Mode

GESTURING FOR CONTROL INPUT FOR A VEHICLE

This application is a Continuation-In-Part application and claims priority to U.S. non-provisional patent application Ser. No. 16/246,897 filed Jan. 14, 2019 which claims priority to U.S. provisional patent application No. 62/616,892 filed Jan. 12, 2018, the entire disclosures of which are hereby incorporated by reference and relied upon.

BACKGROUND OF THE INVENTION

Field of the Invention

The invention relates generally to vehicle control systems, and more particularly to vehicle control systems utilizing input from a gesture sensing device (GSD).

Description of Related Art

Advances in global positioning systems (GPS) and sensing technologies has led to highly accurate motive control systems capable of maintaining a control point to within a few feet of the target even with basic civilian GPS receivers. This is done through many different algorithms and methods. Basic control provides for example, any one or more of the following: holding a vessel's position when used as an anchor-less GPS anchor, directing a vessel to move along a straight line, and directing a vessel to navigate from point to point. Significant improvements in positioning have been made possible by increases in GPS accuracy due to differential corrections, multi-band phase detection, inertial dead-reckoning improvements, and the use of statistical estimation algorithms such as Kalman filters. With these systems, control input parameters such as position and direction are used to control the motive system to achieve the motive algorithm. These input parameters may include: position such as a relative position between device elements, absolute position such as global position (latitude/longitude), and direction. Direction may be relative direction of a vessel vs the motive control (such as thrust), or global direction such as a true direction to the north pole or magnetic compass direction. Control parameters are entered to a device by a user interface system, by providing a desired control. The device then receives or senses the position, and/or directional parameters, and runs the control algorithm based on those. These actual parameters can be sensed in many ways, but typically they are via: a GPS/GNSS positioning device, a directional device which may be augmented by additional sensors to improve accuracy, and a speed/velocity direction gesture sensing device, often part of the GPS system.

With the advent of enhanced GPS functionality, user interface/user experience has been an important feature of the systems. Systems exist that include an on-screen selection of control parameters such as anchor at point, vector in direction, and route from point to point in the ProNav® Angler, selection of a route or depth contour in the Minn-Kota® iPilot Link, and selection of routes in the Motorguide®/Lowrance® Pinpoint with Gateway. Other methods exist such as selection of a new anchor point in the Minn-Kota® iPilot by selecting a direction to move a control via multiple direction buttons oriented based on the orientation of the vessel, and changing direction of a straight line vectoring by pressing a button in the direction to adjust. What is needed are improvements in the user interface and the user experience when using these systems.

SUMMARY OF THE INVENTION

The article of invention is a vehicle control system (VCS) comprising an electronic control system located on board a vehicle and a gesture sensing device (GSD). Methods to provide control inputs to a vehicle utilizing sensing motion parameters exhibited by a user such as the action of pointing and gesturing are translated into an updated control parameter and sent to the electronic control system.

In one form, a vehicle control system comprises a gesture sensing device (GSD).

In one form, a vehicle control system comprises a gesture sensing device in communication with an electronic control system. In one form, a gesture sensing device is in the form of one or more of: a remote control, a smart phone, a smart watch, and smart glasses.

In one form, user input to a vehicle control system (VCS) is in the form of pointing a gesture sensing device in a direction of desired travel.

In one form, user input to a VCS is in the form of pointing a gesture sensing device toward a direction of desired position jog.

In one form, user input command is in the form of changing an inclination angle of a gesture sensing device.

In one form, user input command in the form of changing an inclination angle of a gesture sensing device reflects a distance to jog or a speed to travel.

In one form, user input command in the form of a steeper inclination angle of a gesture sensing device implements a higher speed of a vehicle.

In one form, user input command to a gesture sensing device in the form of continually directing a motive direction by use of gesture in the direction of travel results in a consequent continuous drive.

In one form, a gesture sensing device comprises a microphone whereby the gesture sensing device may receive voice commands for motive control.

In one form, input command signals from a gesture sensing device and an auxiliary control device such as a foot pedal are processed by an electronic control system (ECS).

In one form, inertial and directional measurement technology such as one or more of motion and orientation sensors are utilized in a gesture sensing device.

In one form, a directional device such as an electronic compass is utilized to indicate a controlled direction to an algorithm.

In one form, one or more of inertial and directional measurement techniques perform statistical analysis on signals received from sensors in a gesture sensing device to estimate sensed parameters.

In one form, one or more of inertial and directional measurement techniques such as Kalman estimation algorithms and quaternions perform statistical analysis on signals received from sensors in a gesture sensing device to estimate sensed parameters.

In one form, an orientation sensing gesturing device is utilized to interact with and detect motion and orientation a user places on a gesture sensing device.

In one form, sensors in a gesture sensing device sense one or more of: yaw and roll, and absolute position of the gesture sensing device whereby absolute position is a global latitude and longitude point.

In one form, a gesture sensing device senses by one or more of: a global reference, and differentially from a known reference.

In one form, a minimal amount of sensors that will result in a direction are utilized in a gesture sensing device to provide direction. For example, a magnetic sensor alone, such as 2 axis magnetometer or magnetic compass could provide a direction assuming the gesture sensing device is held in a horizontal plane. Preferable embodiments of a gesture sensing device include a 9 axis sensor which includes a 3-axis gyroscope, a 3-axis accelerometer, and a 3-axis magnetometer.

In one form, a compass is utilized in a gesture sensing device to provide direction input.

In one form, inertial measurement parameters are utilized to report the orientation of a gesture sensing device and to provide an accurate direction of a gesture sensing device.

In one form, inertial measurement parameters such as tilt compensation utilize input from acceleration and gravity detection sensors in a gesture sensing device.

In one form, rotation sensors (also known as gyro sensors) in a gesture sensing device are utilized to compensate for a calculation of attitude and heading.

In one form, single or combination integrated circuits are utilized within a central processor of a gesture sensing device.

In one form, a gesture sensing device comprises a power source such as a battery to power its processor, sensor, and communication functions. Alternatively, power for the GSD is supplied from wired on board power from the vehicle.

In one form, a vehicle control system utilizes a trolling motor for control of a marine vessel.

In one form, a steerable device that may include thrust exerts control over a vessel in response to gesturing control (command) inputs.

In one form, the steerable device is in the form of a trolling motor system.

In one form, a trolling motor system comprises one or more steerable thruster.

In one form, a trolling motor system comprises a steer actuator to control direction of a thruster.

In one form, a trolling motor system comprises a fixed direction thrust.

In one form, a trolling motor system comprising a fixed direction thrust is one of longitudinal (to thrust forward) and lateral (to thrust sideways).

In one form, a trolling motor system comprises a steerable thruster and further comprises a direction sensor to indicate direction of thrust.

In one form, a trolling motor system comprises an optional direction sensor to indicate vehicle direction.

In one form, a trolling motor system comprises a GPS receiver affixed on one or more of a vessel and a steerable thruster.

In one form, a vehicle control system comprises a remote gesture sensing device with directional sensing optionally comprising an attitude device for advanced functions.

In one form, an electronic controller utilizes positional and direction signals, and control signals from a gesture sensing device.

In one form, the electronic controller is configured to interface with a steerable thruster system to control the output power and the directional heading of a steerable thruster.

In one form, the electronic controller comprises a GNSS positioning device. Common names for GNSS are: GPS (US), GLONASS (Russian), Galileo (European), and BeiDou/COMPASS (Chinese). GNSS (Global Navigation Satellite System) is a satellite system that is used to pinpoint the geographic location of a user's receiver anywhere in the world. In some embodiments, basic positioning is performed as time-based GNSS with no correction. In other embodiments positioning is enhanced using a differential correction such as WAAS technology. In some embodiments positioning may be enhanced for faster time to first fix using an assisted method to receive the positional fix data (for GPS system, commonly called Assisted-GPS or A-GPS). The positional fix data is transmitted through connection to a global data network.

In one form, the electronic controller comprises a device for determination of the heading and orientation of the steerable thruster. The most basic configuration consists of a compass to determine the direction of the steerable thruster. Types of compass may include the following examples: 2 or 3 axis electronic magnetic flux/hall sensor or a mechanical compass with sensing such as but not limited to the following examples: position encoding, potentiometer and/or hall effect sensing. A further configuration to determine heading of the steerable thruster may utilize differential GNSS, by utilizing 2 antennas fixed relative to the axis of the thruster.

In one form, a vehicle control system comprises a controller that processes sensing data from each sensor in a gesture sensing device and translates the sensing data into control inputs for a steerable thruster to guide direction and magnitude of thrust.

In one form, a vehicle control system comprises a display unit, to display current information of vehicle movement relative to a map.

In one form, a vehicle control system comprises a display unit that is disposed on a gesturing sensing device or disposed on a vehicle mounted device (i.e. a marine chart plotter) or on both.

In one form, a vehicle control system comprises a display unit providing a visual input of one or more of routing and management of data points. These routing data points displayed on screen are referred to as routing points which are successive absolute positions which are used for navigating between successive points.

In one form, a vehicle control system comprises multiple thrusters to assist in controlling orientation of a marine vessel.

In one form, a vehicle control system runs as a process on a mobile computing device such as one or more of; a smartphone, tablet, smart-watch, PDA, and similar device.

In one form, a vehicle control system runs as a process on a remote gesture sensing device whereby the remote gesture sensing device is equipped with or is absent a display screen.

In one form, a vehicle control system runs as a process on a remote gesture sensing device whereby the remote gesture sensing device is equipped with or is absent indication lights.

In one form, a vehicle control system comprises a position jogging function whereby a user's vehicle position is moved a predetermined amount from one location to another when activating this function. In an anchor mode for example, the position jogging function moves (jogs) the anchor point based on a control attribute of a global point, to a new point in a predetermined direction at a predetermined distance away. A control attribute is a control parameter associated with a particular operational mode.

In one form, a method of utilizing a vehicle control system having a gesture sensing device comprises the following steps. Running a process on an on-board vehicle control system to determine at least one of a global position and differential position of an associated vehicle from a known reference point. Running a process on a corresponding gesture sensing device determining at least the direction of the gesture sensing device and optionally sensing the pitch, yaw, and roll of the gesture sensing device. Establishing wired (i.e., serial communication) or wireless (i.e., WIFI, Bluetooth, radio frequency) communication between the on-board electronic control system and a corresponding gesture sensing device. A user directing a position to be changed by providing one or more of the following input commands in a gesture sensing device: a button press, sensing a defined gesture (i.e., such as twisting or chopping motions), a voice command, and alternatively a signal received by the on-board control system from an auxiliary input device such as a foot petal. Sending absolute change of position signals indicating a positional change from the gesture sensing device to an electronic control system. Updating the commanded positional information in the electronic control system, and activating the electronic control system to direct the vehicle to the desired command position.

In one form, an electronic control system sends control input to one or more of a steer actuator and a thruster to direct the vehicle to the desired command position.

In one form, position change signals are sent from a gesture sensing device to an electronic control system using signals from sensors detecting direction and angle of a gesture sensing device.

In one form, pointing a gesture sensing device towards a desired direction produces command signals that are conveyed to an electronic control system to implement motive control in that direction.

In one form, angling a gesture sensing device produces signals to an electronic control system providing a distance by trigonometry. For example, the tangent of an inclination angle of a gesture sensing device and a height are inputs, and the horizontal leg of the triangle is the output. In some forms, the height is approximated as the approximate height above a reference plane such as above water or such as above a road for example. In one form, calculations of the distance are calculated on the gesture sensing device and in other forms by a control algorithm.

In one form, position change signals are sent from a gesture sensing device to an electronic control system using signals from sensors detecting a jog distance gesture from a gesture sensing device. Pointing a gesture sensing device towards a predetermined direction (primary motions) produces signals to an electronic control system to move in that direction. In one form, jog distance corresponds to signals from a gesture sensing device as a gross detection of gesture sensing device angle as described previously using a direction and angle algorithm where the distance would be based upon the inclination or roll angle (secondary motion). In some forms, distance signals from a gesture sensing device are proportional and correspond to a linear equation, whereby high angles of inclination such as 75 degrees would signal the longest jog, (for instance 30 feet), and small angles of inclination such as 25 degrees would be the shortest jog (for instance 5 feet). In between, the distance would be found by a linear equation. In alternative forms, to make the position jogging more obvious to the user, inclination angles are grouped, where for example, a sharp angle of 75-90 degrees signals to jog a small amount (for example 10 feet) and a moderate angle of 30-75 degrees signals to jog an intermediate amount (for example 20 feet), and a shallow angle (<30 degrees) would jog a large amount, (for example 30 feet).

In one form, position change signals correspond to a direction a gesture sensing device is pointed and incrementation of jog distance is calculated by pointing the gesturing device at the location intended. This action makes an assumption of height above a datum with the intended location using trigonometry to determine the desired distance.

In one form, position change signals from sensors in a GSD correspond to a direction a gesture sensing device is pointed and jog distance corresponds to human interface devices such as buttons. For example, in one form an indication for incrementation of the jog distance corresponds to single button presses of different buttons on a gesture sensing device such as for example jog buttons of 10, 20 and 30 feet. In alternative forms, multiple button presses increment the distance to be jogged, for example a single button press could jog 5 feet, and successive button presses could jog an additional 5 feet.

In one form, a gesture sensing device is configurable, such that the jog distance is set by a user either in software configuration, or immediately by entering an amount. Alternatively, one or more of a slider and dial on the gesture sensing device may be used to indicate an amount of distance change.

In one form, directional signals are output from a gesture sensing device by pointing toward a desired location. The direction may then be additionally or alternatively jogged or moved from one location to another by use of the following steps. Running a process on the on-board electronic control system determining the position of the vehicle either globally or differentially from a known reference point. Running a process on the gesture sensing device determining the direction of the gesturing sensing device, and optionally determining one or more of; the pitch, yaw, and roll of the gesturing device based on sensors in the device. Establishing one or more of wired and wireless communication between the on-board electronic control system and the gesture sensing device. Providing an input command from the user that a direction is desired. In some forms, an input command from a user may include but is not limited to one or more of: A) a human interface device such as a button press, B) defined gesturing, such as a twisting motion or chopping motion of the gesturing device, C) voice commands, and D) indication from a second device in communication with the system (for example, a foot pedal in communication with the main electronic control system). Then sending the command change information (control input) from the gesture sensing device to the electronic control system.

In one form, a method for sending command change information includes the step of a user changing the yaw angle of a gesture sensing device.

In one form, directional control (directional input commands) also provides an indication of desired speed from the gesture sensing device to the electronic control system. For example, directional control could be by any of the following: 1) human interface indication, such as one or more of a button indicating speed up/down, a slider indicating absolute speed, a joystick, and wheel or knob, 2) using pitch angle to indicate the speed desired (for example, holding the gesture sensing device in the direction desired (primary motion) with the GSD flat relative to global horizontal datum (secondary motion) to indicate full thrust or speed, and pitching down may indicate a slower thrust or speed), 3) utilizing roll angle to indicate the speed desired (for example, indicating desire to change command while holding the gesturing device in the direction desired with the device flat relative to a global horizontal datum may indicate a speed or thrust of zero, and twisting the device at higher angles along its roll axis (either positive or negative—i.e. off-horizontal) would indicate higher thrust or speed), and 4) a center band is formed wherein pitch angles within the band result in no changes whereas raising above a predesignated angle facilitates incremental increasing speed, and below an angle facilitates incremental decreasing speed.

In one form, a vehicle control system comprises configurable parameters.

In one form, a vehicle control system comprises a configurable parameter wherein the incremental jog size of positional holding points are adjustable. For example, smaller jog size increments may be desired in small bodies of water whereas larger jog size increments may be desired in deeper bodies of water. The terms anchor points, control points, and holding points are synonymous terms although the latter terms tend to allow a greater deviation from an absolute point.

In one form, a vehicle control system comprises a configurable parameter enabling speed to be controlled from user motion of a gesture sensing device (secondary motion).

In one form, a vehicle control system comprises a configurable parameter wherein a user chooses between button input, directional input, gesture input, and voice command input.

In one form, a vehicle control system comprises a configurable parameter for jogging an anchor point.

In one form, configurable parameter for jogging an anchor point utilizes fuzzy logic for the distance to be jogged. For example, a greater than 70 degrees downward pitch indicates anchor at the current location, whereas less than 30 degrees downward indicates to anchor at a predetermined distance away.

In one form, a configurable parameter for jogging an anchor point utilizes an adjustable distance to jog whereby a user defined input is used to set a maximum distance to jog away or setting incremental distances to jog away.

In one form, a configurable parameter for an anchor point includes methods to indicate an anchor jog versus an anchor hold position. For example, pointing a gesture sensing device straight down while indicating to anchor is one method for setting a parameter whereas duration of press of pressing a button is another method of setting a parameter. For example, a short press is to anchor in location, a long press is to use gestured anchor.

In one form, a configurable parameter for directional jogging includes configuring whether a jog is a compass heading direction or a course over ground GPS direction which follows an established GPS line from an absolute position.

In one form, a configurable parameter for directional jogging includes configuring a method for setting the speed. For example, utilizing the current speed of a corresponding vehicle may be used and requiring an indication to change speed, or by using the angle of the gesturing device to set the speed.

In one form, a configurable parameter for manual drive comprises methods to set the speed.

In one form, a configurable parameter for manual drive comprises methods of control of a gesture sensing device.

In one form, a configurable parameter for manual drive comprises choosing whether the vehicle control system is in a commanded automatic mode (follows a line) or a manual mode (i.e. does not follow a predetermined path).

In one form, a configurable parameter for manual drive comprises choosing an automatic commanded mode after stopping, i.e., continuing on directional control, or stopping and anchoring at a location.

A variety of methods may be used for configuration of a vehicle control system. A particular system may use one or more of the following: button sequences, utilizing a menu on a display, utilizing a third device, and manual configuration (i.e., user inputs value directly).

In one form, configuring a vehicle control system comprises using button sequences. For example, pressing two buttons simultaneously on a gesture sensing device may be used to enable a function and in other situations disable a function.

In one form, configuring a vehicle control system comprises responding to options presented on a display via use of a menu structure.

In one form, configuring a vehicle control system comprises configuring software that is loaded on the vehicle control system.

In one form, configuring a vehicle control system comprises utilizing a third device such as a mobile computing device, a chart plotter, or a smartphone running a configuration app in communication with the vehicle control system.

In one form, configuring a vehicle control system comprises manually configuring one or more of switches, sliders, and jumpers to indicate a desired configuration to be used.

In one form, a gesture sensing device comprises a point in the direction of travel feature wherein by aiming the gesture sensing device in the direction of travel or visually at a landmark sets a current track via a compass or GPS line heading.

In one form, a gesture sensing device moved yaw then activating the jog button defines a global direction of position jog.

In one form, a gesture sensing device uses a secondary motion of angle change (i.e., up/down or rotation) to indicate how far to jog from a current position.

In one form, a gesture sensing device comprises a point to a marker point function whereby a user can point the GSD towards a stored marker point to instruct the controller to implement movement of the vehicle towards the marker point.

In one form, a gesture sensing device is utilized to control a secondary vehicle such as a boat vessel in a particular direction, or as another example to direct a drone in a particular direction.

In one form, a gesture sensing device is utilized to control direction and speed of a vehicle. For example, the gesture sensing device is pointed to a direction to move in and the jog button is activated. Optionally, as a secondary motion, inclination angle or roll angle of the gesture sensing device may be used concurrently to indicate the magnitude of thrust. In one form, a range of thrust (a band) is configured to provide a choice to use slow or faster adjustments.

In one form, a gesture sensing device comprises a mark button. The mark button is depressed to save a current waypoint location. Depressing the mark button sends a unique command to the electronic control system to save the coordinates of the point.

In one form, depressing a mark button provides a timestamp used for metadata that is then saved.

In one form, depressing a mark button saves information detailing the mode a vehicle control system was in at the moment and may include other important parameters such as speed.

In one form, a gesture sensing device comprises a play/pause button.

In one form, a gesture sensing device comprises a play/pause button with associated mode changing which enables a pause in a current mode, and a unique method to switch between modes, saving a previous mode. For example, this feature provides a user operating in a particular mode to change modes due to an event, such as needing to stop to untangle a fishing line, provide right-of-way to another vessel, or navigate off-course to avoid an obstacle. In one form, a user resumes the original mode with the press of a button without the need to re-set the desired mode.

BRIEF DESCRIPTION OF SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 5 depicts a front view of example rotational absolute movements a user may move a gesture sensing device;

FIG. 6 depicts a top view of a user moving a gesture sensing device through a yaw angle;

FIG. 7 depicts a front view of a user moving a gesture sensing device through various alternative motions;

FIG. 8 depicts a front view of a user pointing a gesture sensing device downward;

FIG. 9 depicts a diagram showing one method of calculating a distance change in a vehicle control system;

FIG. 10 depicts a chart illustrating actions taken by a vehicle control system considering various operational modes and in response to motions imparted on a gesture sensing device;

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e., 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. Items with reference numbers from 250 to 280 (J and M) represent steps in a method.

Figure 1:
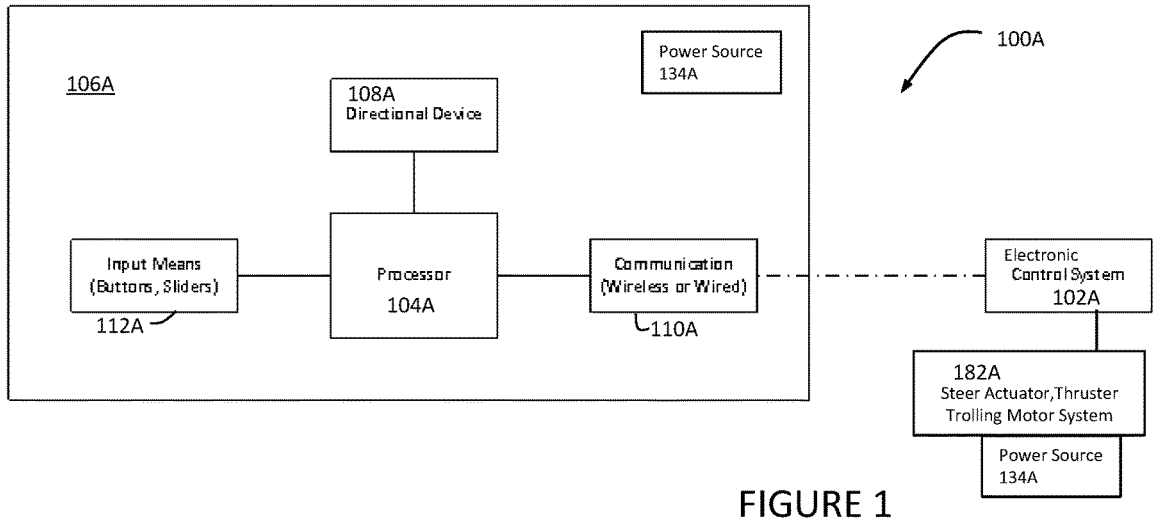
FIG. 1 depicts a schematic view of a basic gesture sensing device linked to an electronic control system.
Figure 2:
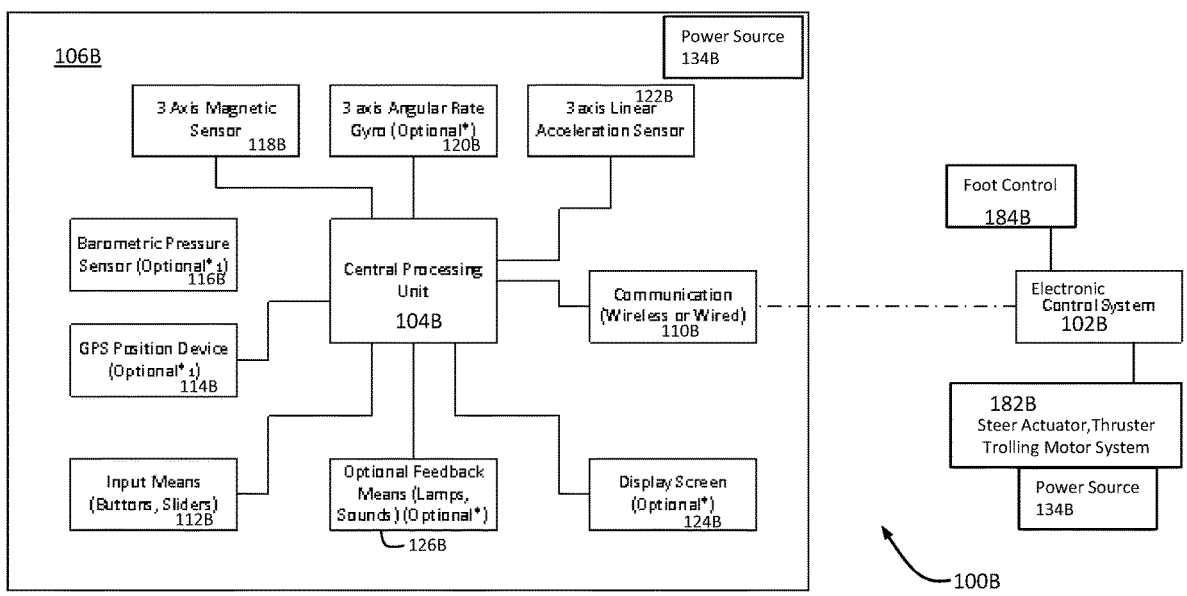
FIG. 2 depicts a schematic view of a gesture sensing device linked to an electronic control system.

FIGS. 1 and 2 illustrate two embodiments of a system architecture that may be used in a vehicle control system (VCS). FIG. 1 illustrates a vehicle control system 100A having a minimum configuration of a gesture sensing device (GSD) 106A which is handheld in preferred embodiments and comprises a wireless (i.e. WIFI, Bluetooth, RF) or wired (i.e. serial communication) communication channel 110A to an electronic control system 102A located on-board an associated vehicle 101 such as boat. The GSD 106A in this embodiment also comprises a directional device 108A which in this minimal configuration is in the form of a 2 axis or 3 axis magnetic sensor providing directional information on position of the GSD 106A to processor 104A (also referred to as a central processing unit). Input means 112A in the form of mechanical inputs such as one or more of buttons and sliders may also be used to provide input commands to processor 104A. A power source 134A such as a battery or wired power from the vehicle is used to provide power to electrical components of the gesture sensing device 106A. An electronic control system 102A processes signals from processor 104A then provides control input signals to one or more of steering and optional propulsion systems 182A of the vehicle such as a steer actuator and optionally one or more thrusters of a trolling motor system which are powered by another power source 134A.

FIG. 2 illustrates a preferred embodiment of a more robust system architecture of a vehicle control system (VCS) 100B comprising a gesture sensing device 106B with optional sensors. The GSD in this embodiment comprises a central processing unit 104B for processing input signals received from any variety of sensors, many of which are optional depending on the embodiment. Directional device 108B sensors in this GSD 106B include a 3-axis linear acceleration sensor 122B for sensing changes in acceleration, a 3-axis angular rate gyro 120B for sensing changes in angle, and a 3-axis magnetic sensor 118B for sensing changes in position. In addition, a GPS positioning device 114B may be used for sensing current location, as well as a barometric pressure sensor 116B for sensing current barometric pressure. One or more input means 112B such as buttons and sliders are included on the GSD 106B to convey commands based on physical input by a user. In some embodiments, a display screen 124B is present to communicate status of various modes of the vehicle control system 100B such as anchoring mode, vectoring mode, and manual mode. A display screen 124B may also display data such as speed, direction, and location. In some embodiments, the display screen is touch sensitive whereby a user may use the screen to input information or select options presented by screen such as configuration inputs and control system inputs. In some embodiments, a feedback generator 126B is used to provide feedback to a user. For example, feedback may be in the form of a light, a sound, a vibration or a combination of two or more of these. A wireless or wired communication channel 110B to an electronic control system 102B is located on-board an associated vehicle. Again, wireless may include but is not limited to WIFI, Bluetooth, RF, whereas wired may include but is not limited to serial communication. A power source 134B such as a battery or wired power from the vehicle is used to provide power to electrical components of the gesture sensing device 106B. An electronic control system 102B processes signals from processor 104B (central processor) then provides control input signals to one or more of steering and optional propulsion systems 182B of the vehicle such as a steer actuator and optionally one or more thrusters of a trolling motor system which are powered by another power source 134B. Electronic control system 102B may also process signals from a secondary input such as a foot control 184B.

Figure 3:
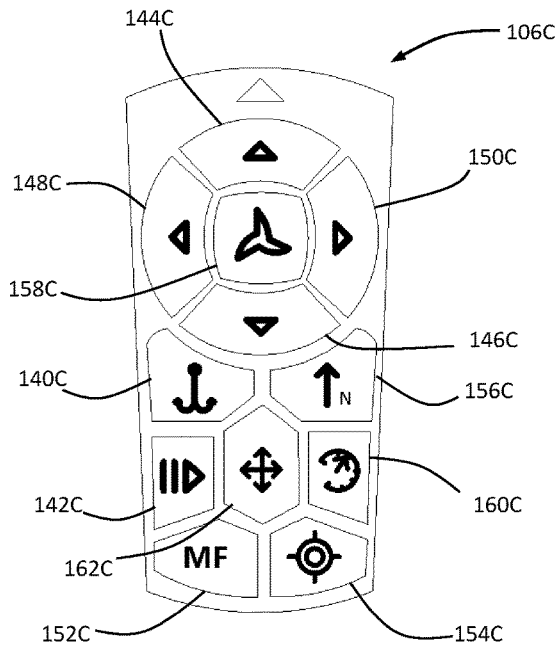
FIG. 3 depicts a plan view of a gesture sensing device.

FIG. 3 illustrates one configuration of buttons on an embodiment of a handheld gesture sensing device (GSD) 106C for a marine vessel. In some embodiments, the buttons are one or more of mechanical and touch sensitive and may be arranged in a variety of configurations on the GSD. Buttons in this embodiment include an anchor button 140C for commanding a vehicle control system to hold the marine vessel at the current global position. A play/pause button 142C temporarily pauses actions currently in progress. A speed up 144C to increase thruster output and speed down 146C button to decrease thruster output. A left button to move to the left 148C and right button 150C to move to the right. A multi-function 152C button which for example can be used as one or more of: a screen toggle in the presence of a display screen 124C when present, and configured as a control button for example to enact a function such as a high-speed bypass (i.e., go to full throttle). A motor on/off 158C button (also sometimes termed a mode button) to activate/inactivate a thruster or in other instances to change modes, a vector button 156C to direct the vessel to follow a heading, a speed mode 160C button for controlling magnitude output of a thruster, a marker 154C for recording a retrievable current location, and a jog button 162C to enact jogging from a travel path or anchor location.

Figure 3A:
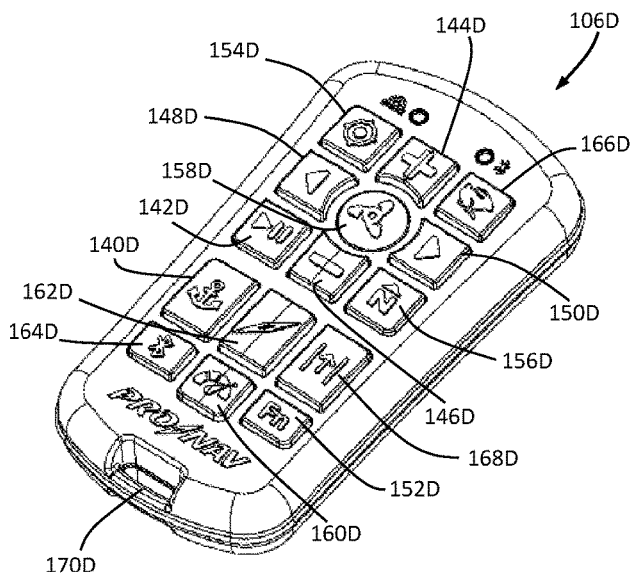
FIG. 3a depicts a perspective view of a gesture sensing device.

FIG. 3A illustrates a preferred configuration of buttons on an embodiment of a handheld gesture sensing device (GSD) 106D also for a marine vessel. In this embodiment, the buttons are mechanical but may also be touch sensitive. It is recognized that one skilled in the art may rearrange and remove/add buttons for best fit for the application. Buttons in this embodiment include an anchor button 140D for commanding a vehicle control system to hold the marine vessel at the current global position. A play/pause button 142D temporarily pauses actions currently in progress then reactivates actions when pushed again. A speed up 144D button to increase thruster output and speed down 146D button to decrease thruster output. A left button to move the vehicle to the left 148D and right button 150D to move to the right. A multi-function 152D button which for example can be used as one or more of: a screen toggle in the presence of a display screen 124D when present, and configured as a control button for example to enact a defined function. A motor on/off 158D button (also sometimes termed a mode button) to activate/inactivate a thruster or in other instances to change modes. Further buttons include: a vector heading button 156 to direct the vehicle to follow a compass heading, a GPS vector 168D button to direct the vehicle to follow a GPS vector line, a speed mode 160D button for controlling magnitude output of a thruster, a marker 154D for recording a retrievable current location, a jog button 162D to enact jogging from a travel path or anchor location, a high speed bypass 166D button for quickly activating full thrust, and a Bluetooth button 164D for activating or inactivating Bluetooth. A retainer 170D, here in the form of an aperture is provided for attaching a tether line whereby the GSD can be tethered to a user's wrist or other portion of their body.

Figure 4:
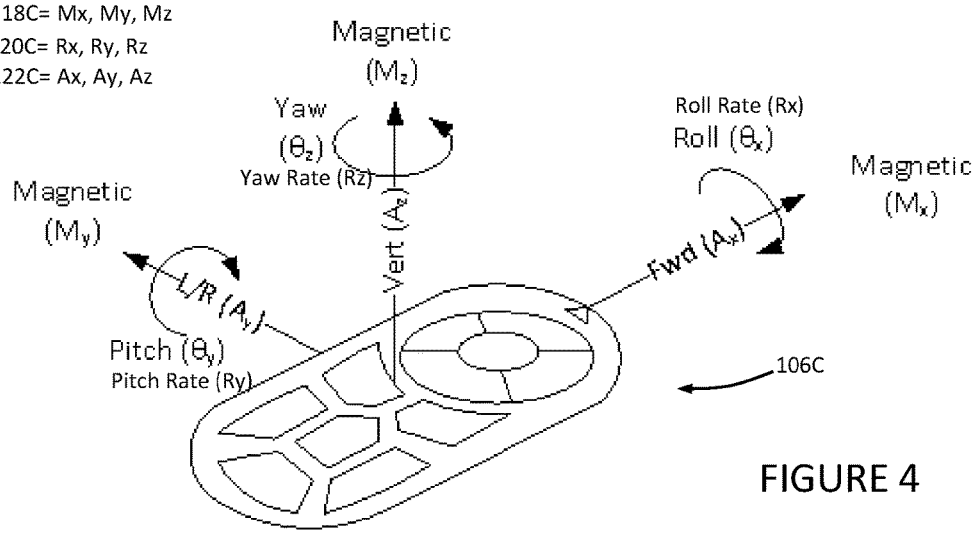
FIG. 4 depicts a perspective view of the axes in a 3-axis magnetic sensor.

FIG. 4 illustrates various axis of a 3-axis directional sensor, indicating the sensed parameters, Accelerations Ax, Ay, Az (122C), Magnetic Flux Measurements, Mx, My, Mz (118C), and Gyroscope Roll Rates Rx, Ry, Rz (120C). A direction device 108C produces θy, θz, θx (pitch, yaw, and roll). Minimally, Mx and My can directly calculate the direction of the GSD. This configuration will be limited, as it would be necessary for the GSD to be held static (still), and flat in the horizontal plane. In the preferred embodiment, the 9 axes of sensing are processed using a statistical mathematic algorithm such as a Kalman Algorithm to produce pitch, yaw, and roll of the GSD 106C. The raw sensor data is sent as electronic signals to a processor (such as 104B), as gesture sensing inputs for processing into Pitch, Yaw and Roll Angles as previously illustrated in FIG. 2. This configuration provides for more advanced sensing, allowing a dynamic measurement of the Pitch, Yaw (heading) and Roll, enabling additional features such as utilizing Roll for Speed or Jog Distance as described herein.

FIGS. 5 through 8 illustrate examples of selected gestures sensed by one embodiment of a gesture sensing device 106D (GSD) as part of a vehicle electronic control system. FIG. 5 depicts a frontal view of a user holding a GSD in their hand and imparting specific motions onto the device. As illustrated here, the GSD is capable of sensing motions such as angle (pitch) by raising and lowering the GSD. This motion can be accomplished for example, by raising and lowering the user's arm about their elbow. The GSD can also sense motions such a rotation by pivoting the GSD about its long axis. This motion can be accomplished for example, by pronating and supinating the user's forearm while holding the GSD in their hand as illustrated.

These movements are an example of rotational absolute movements (as might be used as secondary motion inputs) whereby a user rolls the GSD 106D along an axis while separately or simultaneously changing the pitch angle of the GSD thereby changing distance and speed concurrently.

In FIG. 6, depicted is a top view of a user holding a GSD in their hand and again imparting specific motion onto the device. As illustrated here, the GSD is capable of sensing motions such as yaw angle. This motion can be accomplished for example, by wrist adduction and abduction. As depicted, a GSD 106D is held by a user 158D with buttons facing up while changing a yaw angle of the GSD. FIG. 7 illustrates the user inducing a casting motion into a GSD in one embodiment and inducing a chopping motion in another as an example of a motion concept wherein a specified motion enacts a specific command. FIG. 8 illustrates a user pointing a GSD 106D toward the floor to command for example, a vehicle control system to stop or anchor at the current location.

FIG. 9 illustrates various methods used in a processor of a vehicle control system to calculate a position or change in position of a vehicle in an anchor distance calculation. For example, a change in lateral distance may be calculated by the formula Delta_Lat_distance=distance times cos α.

Delta_Lat_deg=Delta_Lat_dist/1.11E5.

Delta_Lon_dist=(dist/cos(lat))*sin(ang).

Delta_Lon_deg=Delta_Lon_dist/(1.11E5*(cos(lat))).

FIG. 10 depicts a chart illustrating actions taken by one embodiment of a vehicle control system considering various selectable operational modes and in response to motions imparted on a gesture sensing device. As illustrated by the chart for example, in anchor mode, pointing the GSD in a predetermined direction causes the vehicle to be moved in that direction. In addition, the magnitude of the jog of anchor point is adjusted by the level of roll angle imparted on the gesture sensing device. Similarly, pointing the GSD in a direction in vector mode (GPS vector control) adjusts the current heading to the newly pointed direction to follow a GPS line, whereas in vector heading (compass heading) the vehicle follows a compass heading. Manual mode is similar to using the GSD like a steering wheel whereby the vehicle turns in the direction the GSD is pointed.

Figure 11:
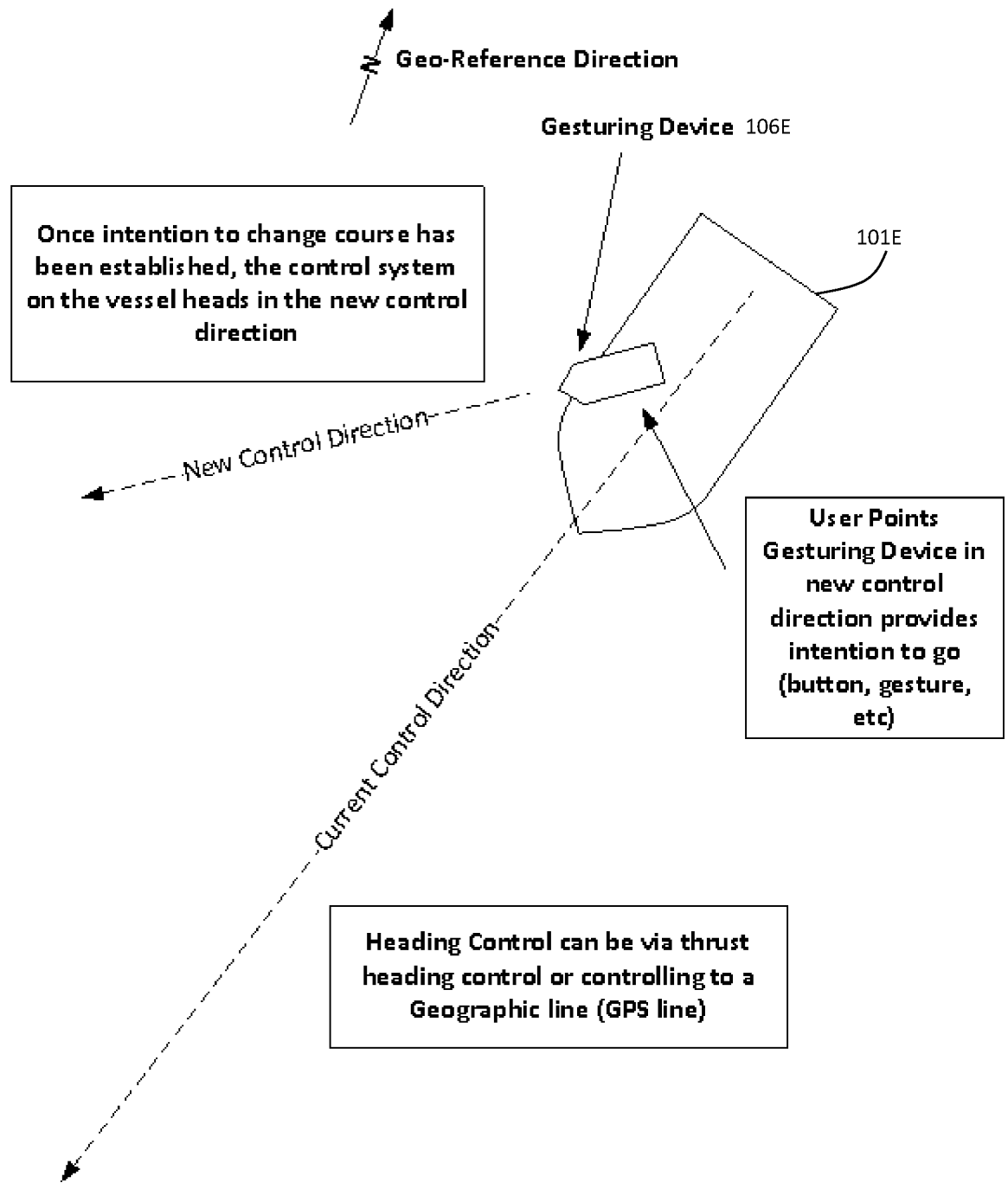
FIG. 11 depicts a plan view illustrating various types of vector control.

FIG. 11 illustrates use of a method of using a vector control function which directs the vehicle to a predefined line in a vehicle control system. A user points a gesture sensing device 106E in a new control direction to indicate a new direction to go. The vehicle control system on the vessel commands one or more of thrusters and steering devices to head the vessel in a new control direction. The heading control can be via thrust heading control thereby following a compass direction or controlling to a GPS line which is unaffected by wind and waves.

Figure 12:
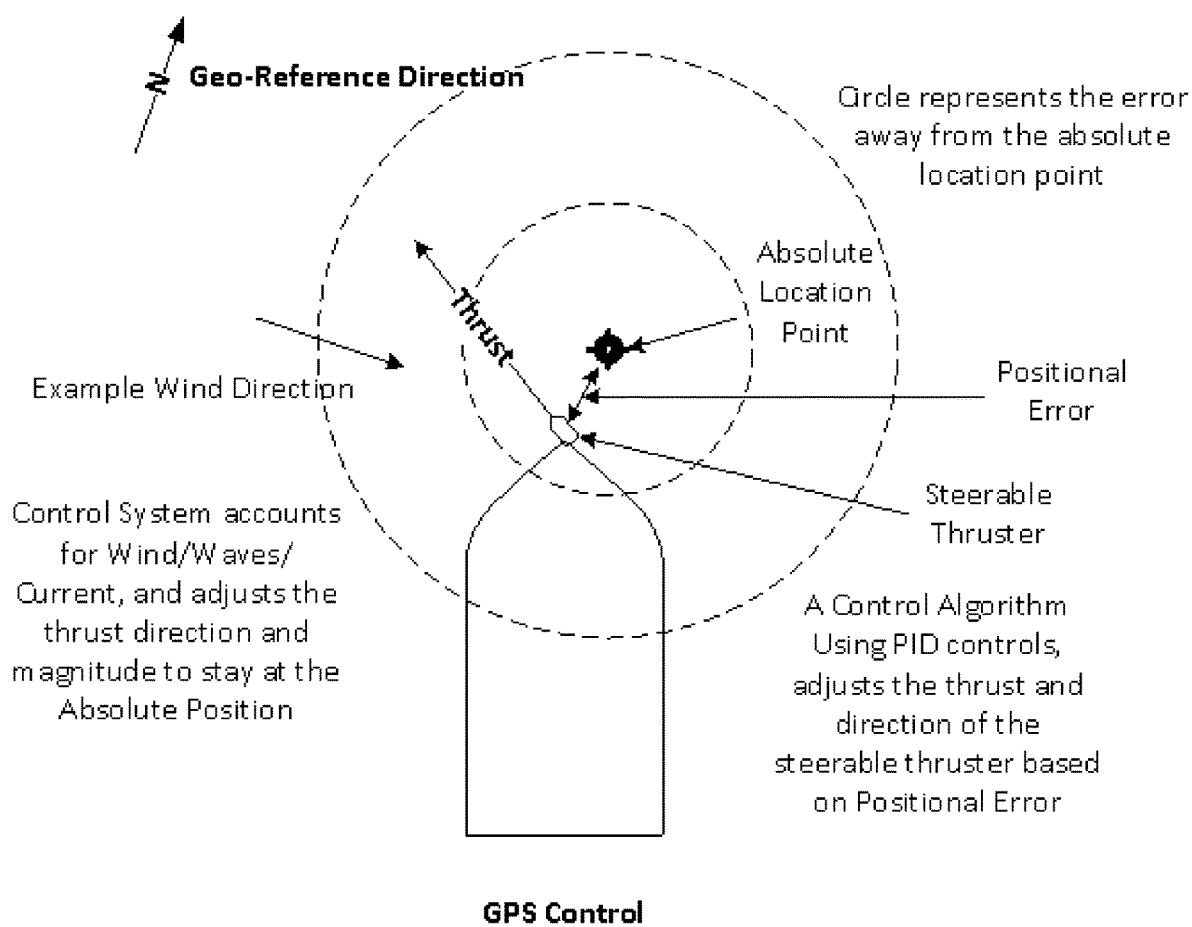
FIG. 12 depicts a plan view illustrating GPS control in anchor mode.

FIG. 12 provides an overview of one embodiment of vehicle control in anchor mode. Here a control algorithm using a proportional integral derivative controller adjusts the thrust and direction of a steerable thruster based on positional error. As wind, waves, current and other forces attempt to move the vehicle such as a boat from an absolute location point, a steering and propulsion system on the boat directs thrust in a direction to keep the vehicle within a predefined zone of error from the absolute location point.

Figure 13:
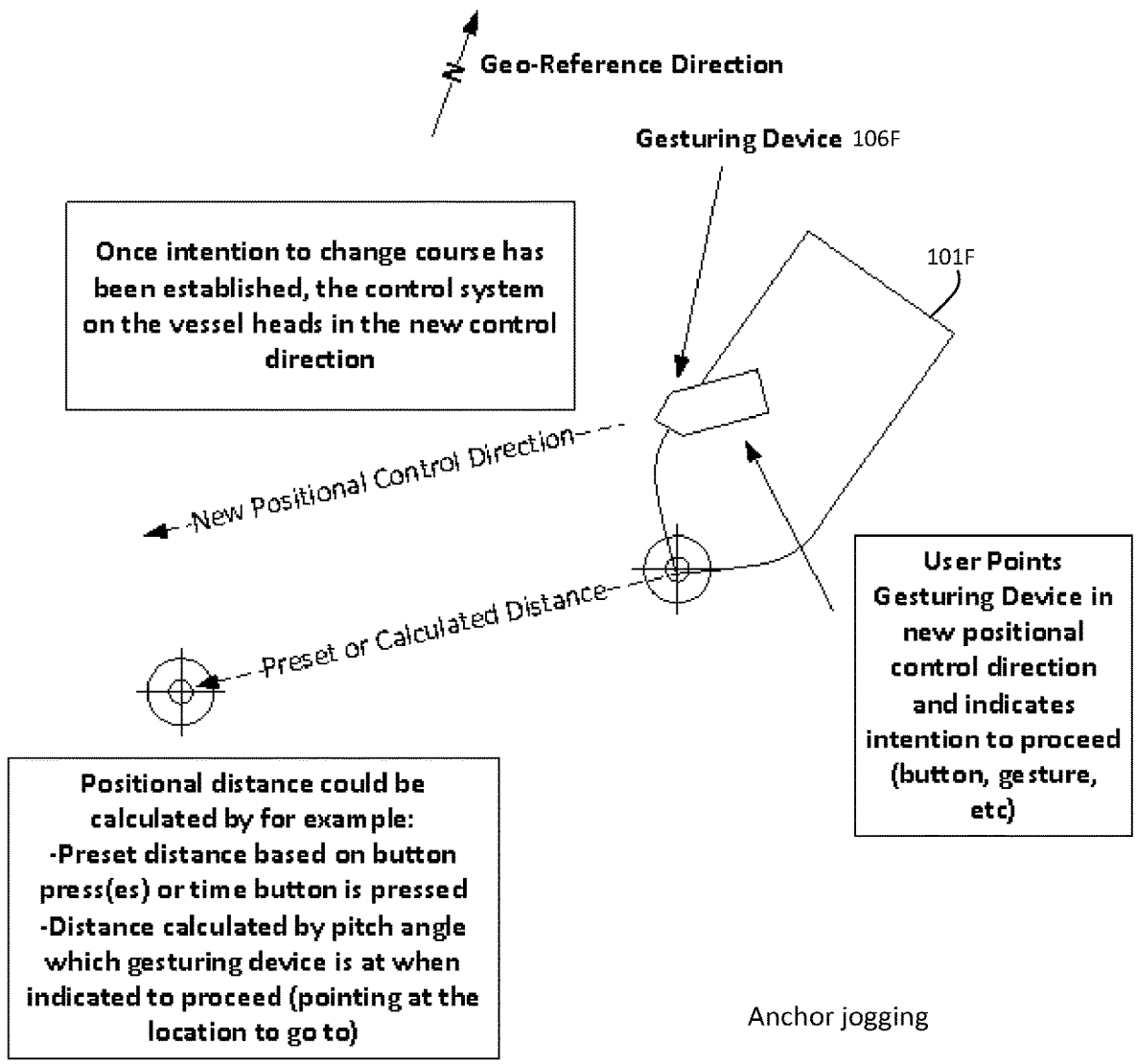
FIG. 13 depicts a plan view illustrating a change using anchor jogging.

FIG. 13 illustrates use of an anchor control function in a vehicle control system. In this embodiment, a user points a gesturing device 106F in a new positional control direction and indicates an intention to proceed by use of for example, making a predetermined gesture or pushing of a command button on the GSD. Once the intention to change course has been established, the vehicles control system sends instructions to the thruster to head the vessel in a new control direction. The distance is calculated in this embodiment by pitch angle of the GSD when the user gives the indication to proceed (i.e., pushing the jog button). In this example, the user is pointing at the location to go to. Alternatively, positional distance of anchor jogging may be calculated by a preset distance based on a quantity of button presses or the length of time a button is pressed.

Figure 14:
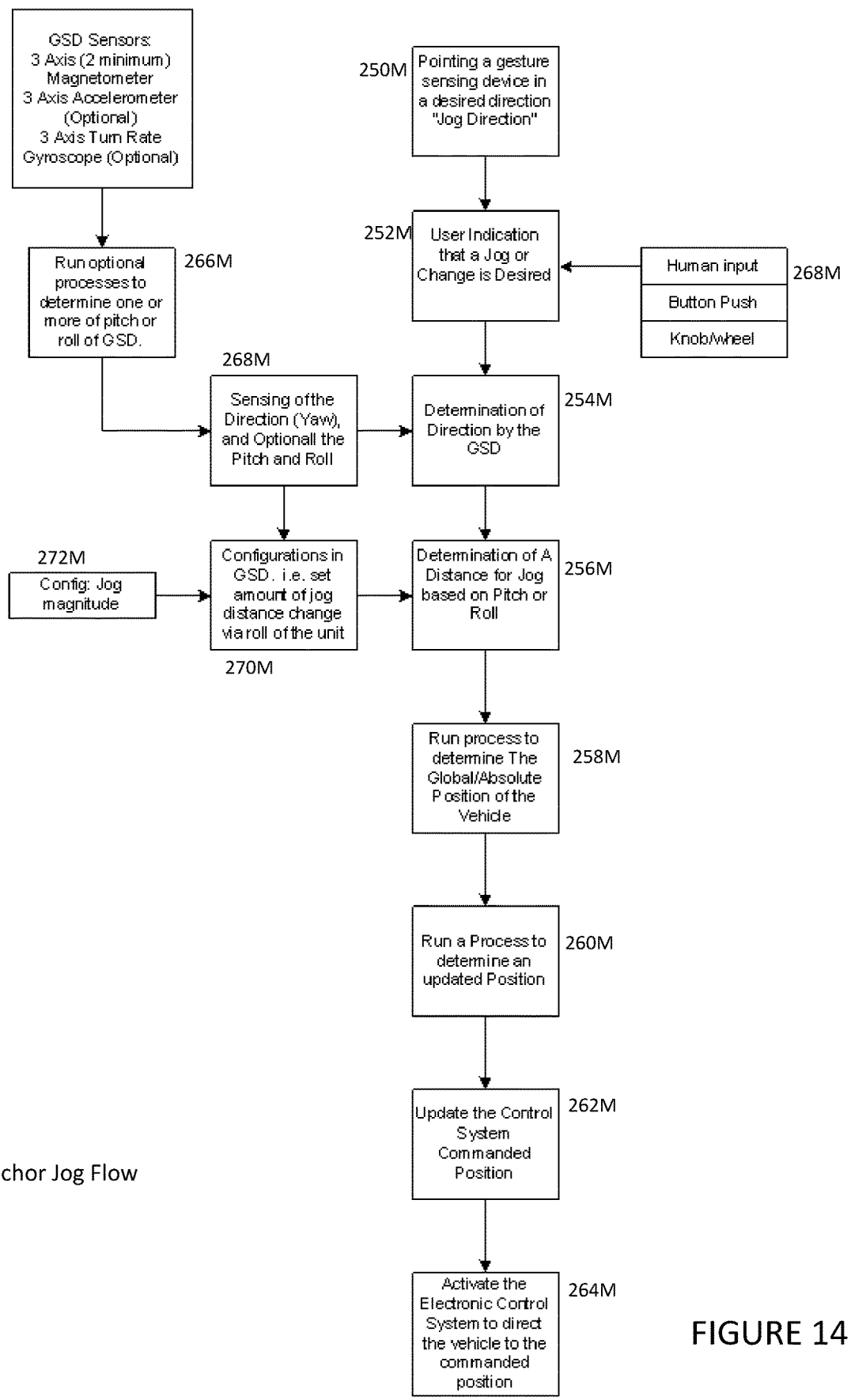
FIG. 14 depicts a schematic view illustrating steps in an anchor jog.

FIG. 14 illustrates one embodiment of the steps to initiate an anchor jog wherein a vehicle control system directs a vehicle to step a defined distance from an original anchor point. In this embodiment, configurations may be made to adjust parameters such as jog magnitude 272M and whether the GSD should utilize roll as an input command 270M. Optional processes may then be run to determine one or more of pitch or roll of a gesture sensing device 266M based on sensing of direction (yaw), and optionally the pitch and roll of the GSD 268M. These configuration values will be utilized as needed during the process. Once configured, the gesture sensing device is pointed in a desired jog direction 250M and the user indicates that a jog is desired 252M by human input 268M such as pressing a jog button 162D. Based on sensing the position of the gesture sensing device in steps 266M and 268M, a new control anchor point is determined by the GSD 254M. Assuming secondary motion was activated in the configurations at step 270M, a process is run to determine the magnitude of the anchor jog based on the roll angle of the gesture sensing device 256M. A process is then run to determine the global/absolute position of the vehicle based on a GPS vector 258M. A process is then run to determine an updated position 260M to move to which may use the calculations discussed in FIG. 9. The control system commanded position is then updated 262M. The electronic control system is then activated thereby directing the vehicle to the new commanded anchor position 264M.

Figure 15:
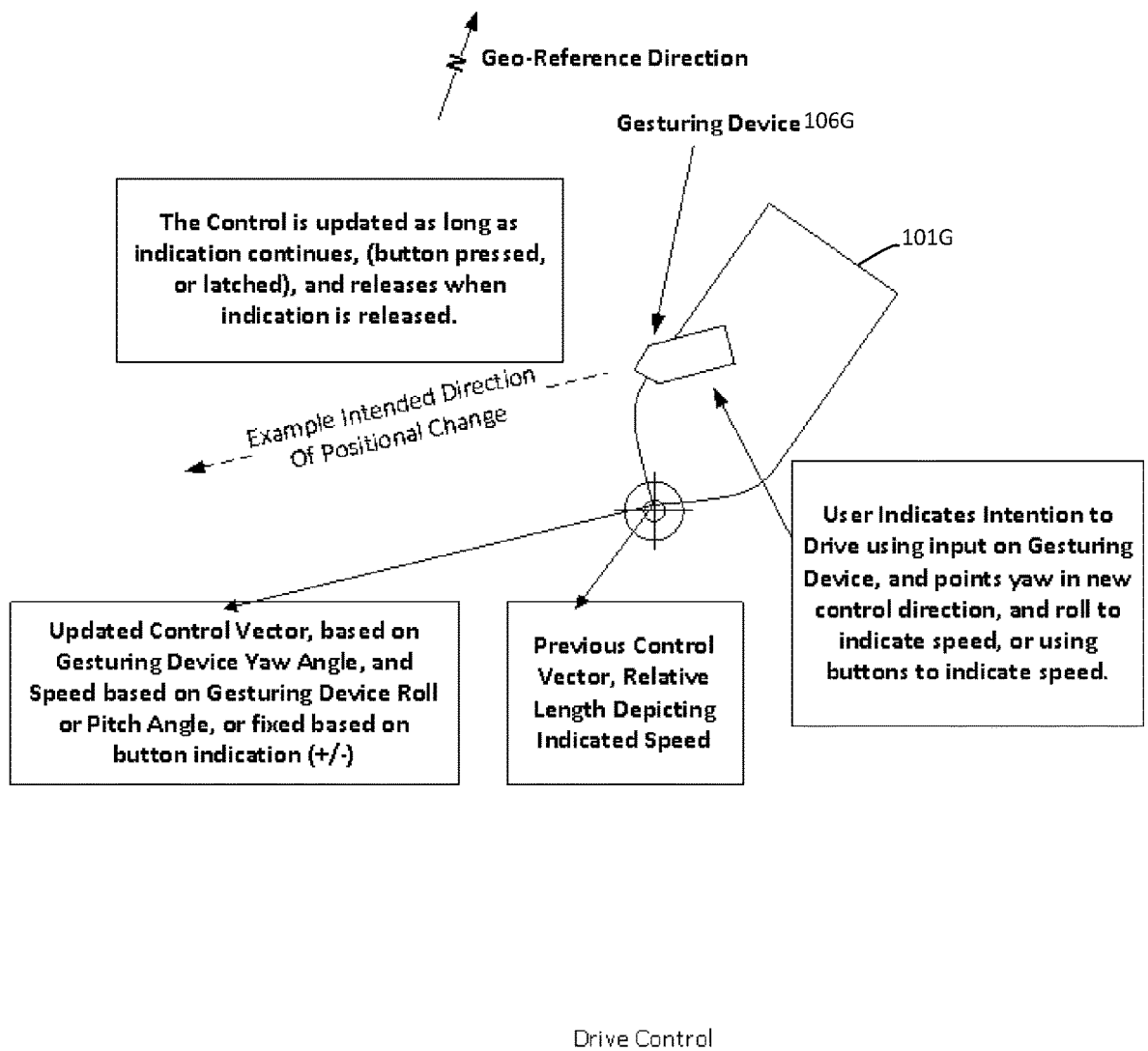
FIG. 15 depicts a plan view illustrating a change using drive control.

FIG. 15 illustrates use of a drive control function in a vehicle control system. In this embodiment, a user indicates their intention to drive using an input method on the GSD. For example, the user points the GSD yaw in the new control direction (primary motion), and rolls the GSD to indicate speed (secondary motion) or alternatively depressing speed buttons on the GSD. These actions update the control vector based on the gesture sensing device's yaw angle for direction, and updates the speed based on the GSD's roll or pitch angle or alternatively based on direct button input.

Figure 16:
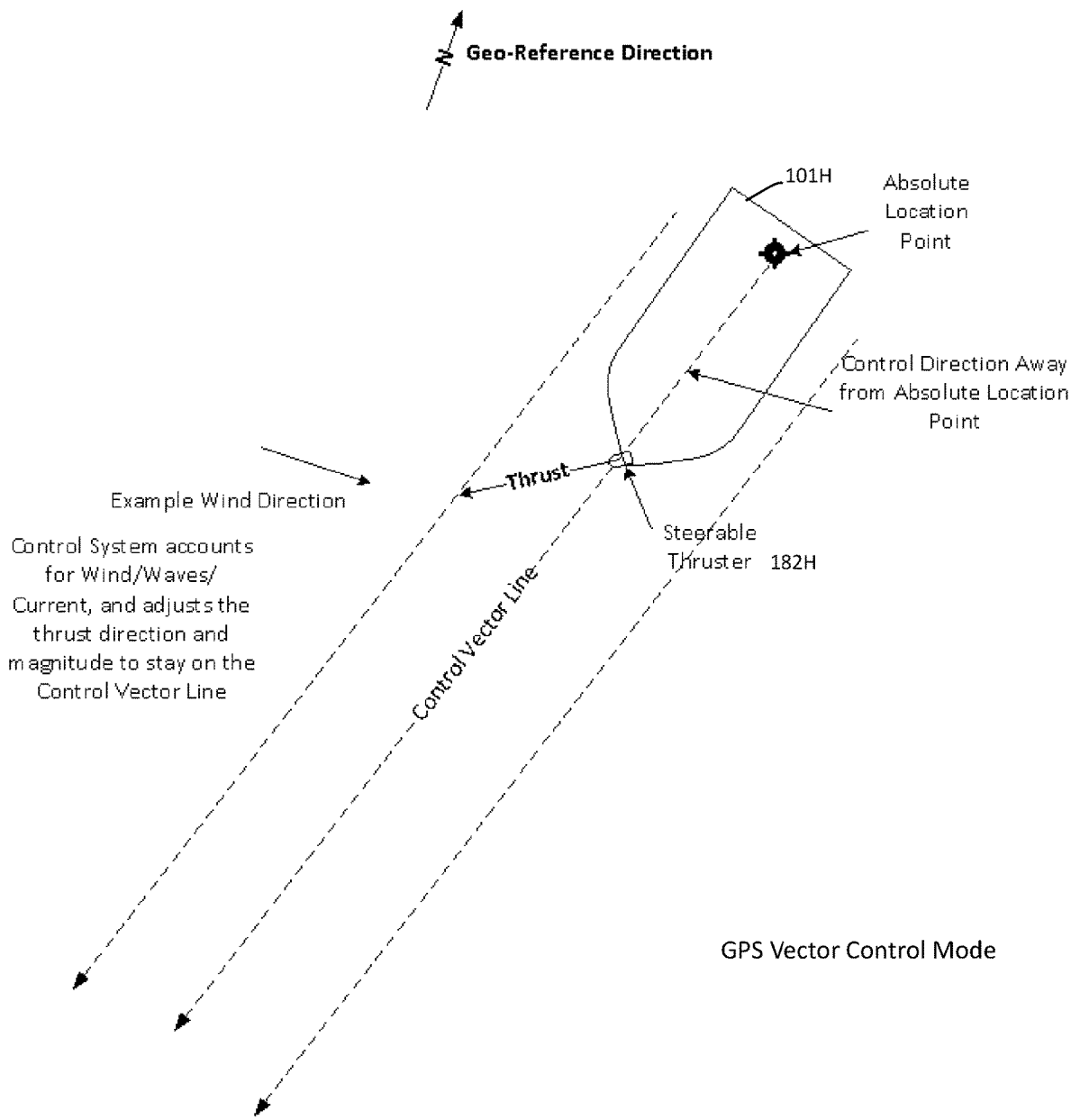
FIG. 16 depicts a plan view illustrating a change using GPS vector control.

FIG. 16 illustrates one embodiment of the operation on a vehicle 101H (here in the form of a boat) of a vehicle control system in GPS vector control mode. Control attributes are parameters required for control mode. A control point, is a selected geographic point about which control is exerted. As illustrated, steering and propulsion system 182H in the form of a trolling motor is providing a starboard directed thrust thereby directing the boat to follow a control vector line of path. In this case, the control vector line of path has a control attribute of a point and direction. The starboard directed thrust thereby prevents opposing wind, waves, current, and other forces from pushing the boat off the predefined control vector line A control vector line is a vector defined by a global position extending in a global direction along a great circle (a circle following the earth's surface in a plane that intersects the center of the earth's sphere). A visual representation of a sensed updated control point rendered on a display screen is defined herein as a display point.

Figure 17:
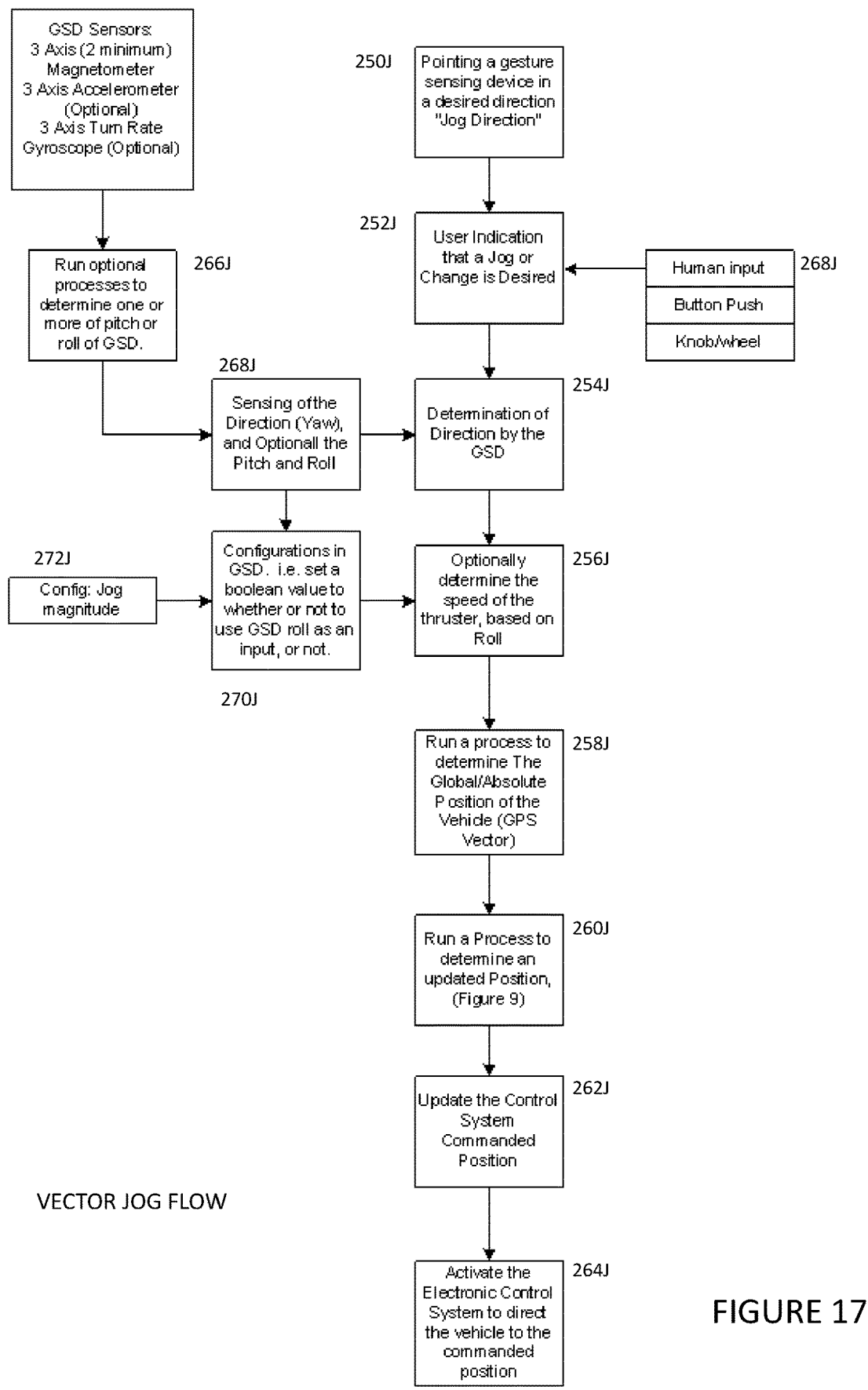
FIG. 17 depicts a schematic view illustrating steps in a vector jog.

FIG. 17 illustrates one embodiment of the steps to initiate a vector jog wherein a vehicle control system directs a vehicle to begin following a new vector path stepped a defined distance from an original vector path. In this embodiment, configurations may be made to adjust parameters such as jog magnitude 272J and whether the GSD should utilize roll as an input command 270J. Optional processes may then be run to determine one or more of pitch or roll of a gesture sensing device 266J based on sensing of direction (yaw), and optionally the pitch and roll of the GSD 268J. These configuration values will be utilized as needed during the process. Once configured, the gesture sensing device is pointed in a desired jog direction 250J and the user indicates that a jog or change is desired 252J by human input 268J such as pressing a jog button 162D. Based on sensing the position of the gesture sensing device in steps 266J and 268J, a new control direction is determined by the GSD 254J. Assuming secondary motion was activated in the configurations at step 270J, a process is run to determine the speed of the thruster based on the roll angle of the gesture sensing device 256J. A process is then run to determine the global/absolute position of the vehicle based on a GPS vector 258J. A process is then run to determine an updated position 260J which may use the calculations discussed in FIG. 9. The control system commanded position is then updated 262J. The electronic control system is then activated thereby directing the vehicle to the new commanded position 264J.

Figure 18:
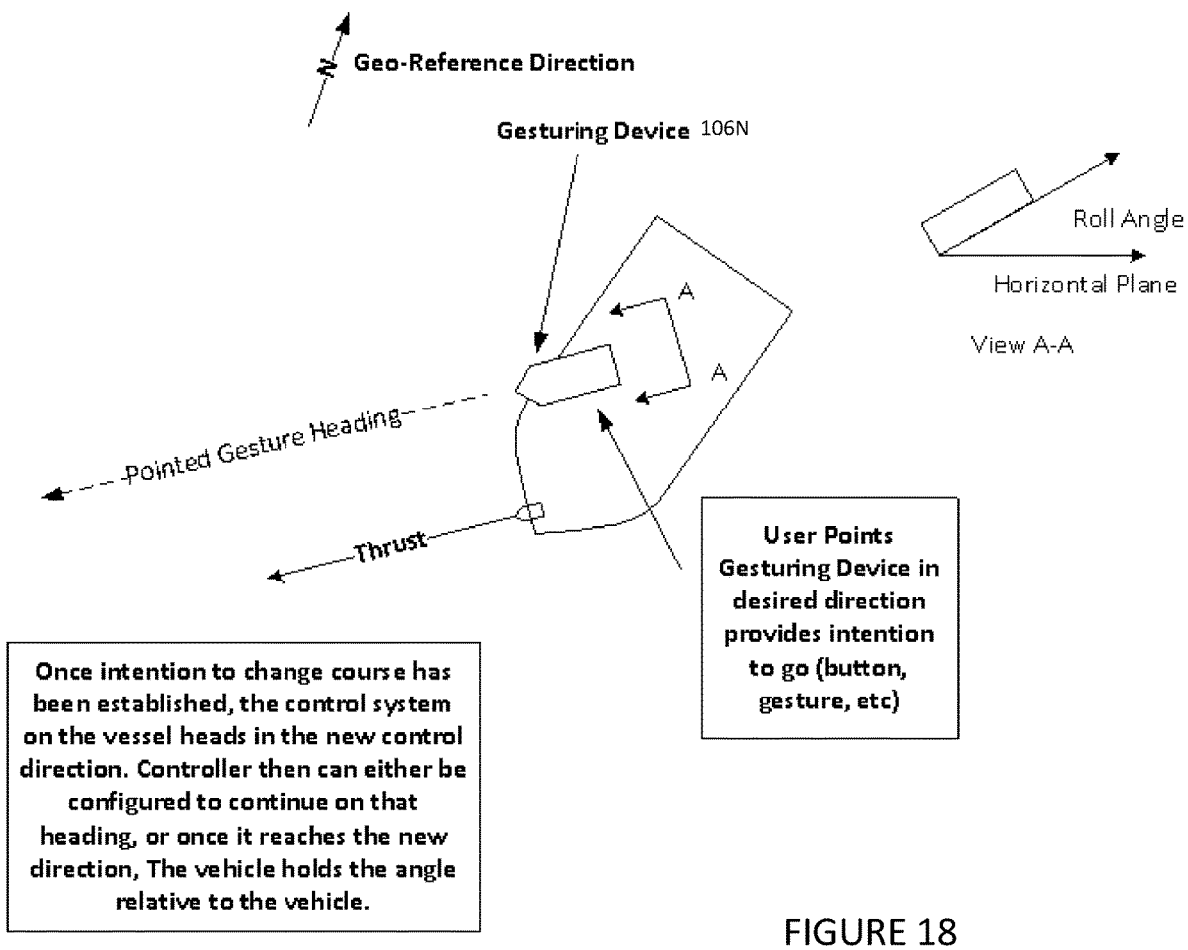
FIG. 18 depicts a plan view illustrating steps in manual drive.

FIG. 18 provides an overview of one embodiment of vehicle control in manual drive mode. In this embodiment, a gesture sensing device 106N is pointed by the user in a desired direction is provides intention to go in the specified direction. This may be done for example by pressing a button (i.e., jog button) or an alternative gesture. The control system then directs a steering and propulsion system to move the vehicle in the commanded direction. Once the vehicle is directed in the new direction, the vehicle holds the angle relative to the vehicle.

Figure 19:
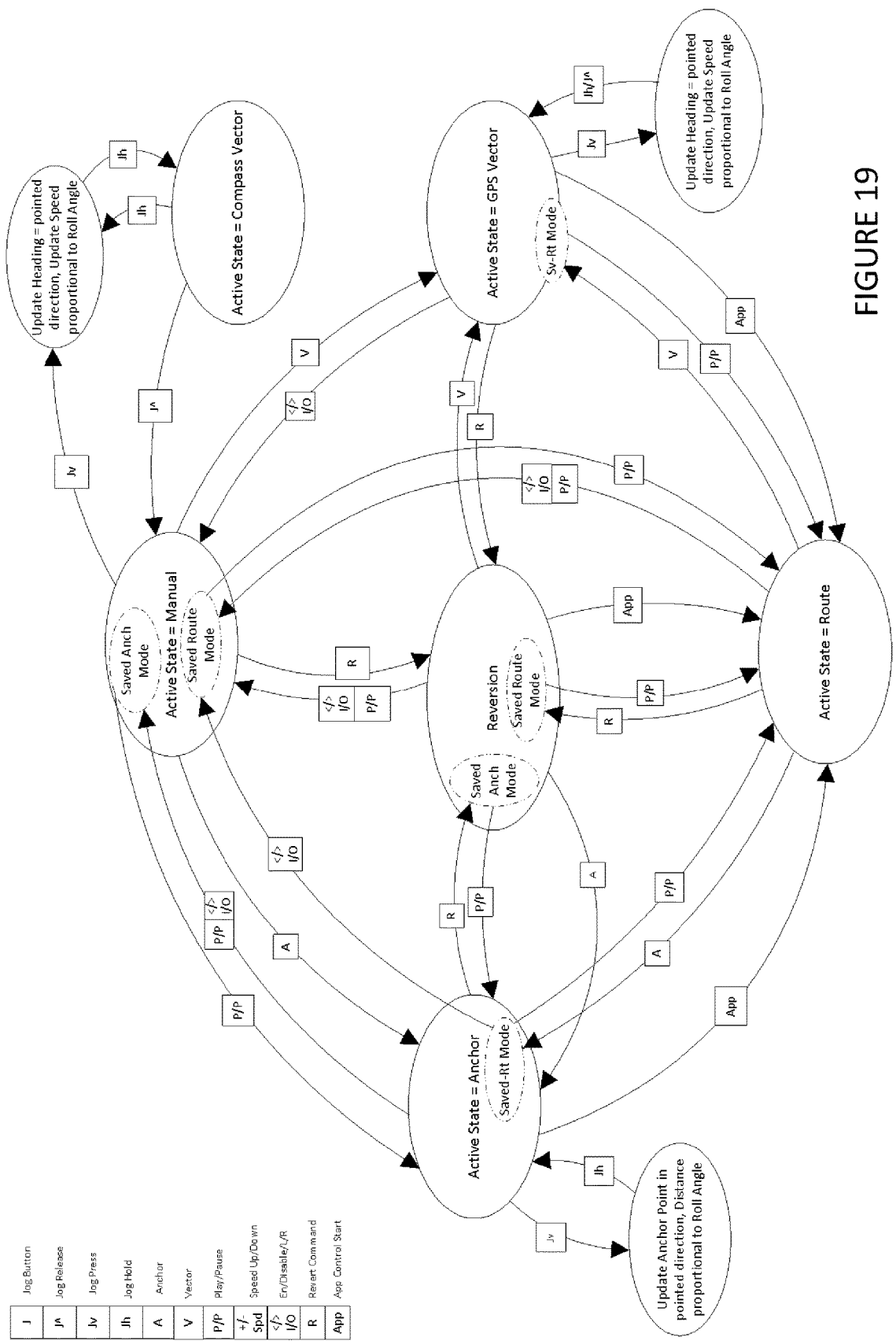
FIG. 19 depicts a schematic view illustrating various driving mode states in a vehicle control system.

FIG. 19 is an illustration of one embodiment of various driving mode states. The diagram illustrates button pushes on one embodiment of a gesture sensing device to actively move between active states of a vehicle control system such as transition between a manually controlled state, an anchored state, following a predetermined route, along a GPS vector, and a compass vector (vector heading). In some embodiments, activating a revert button enables a user to quickly move back to the previous active mode state. As illustrated for example, a user operating a vehicle in an active state of GPS vector mode may wish to jog their vector heading. The user points the gesture sensing device in the new direction and optionally rolls the gesture sensing device relative to the speed. As illustrated, the user will then press the jog button to activate the command. If the user wished to return to the previous active state they could press and hold the jog button. Similar actions may be used to update an anchor point as illustrated on the left side of the illustration. The left side of the illustration links button symbols to button descriptions for this selected embodiment.

Figure 20:
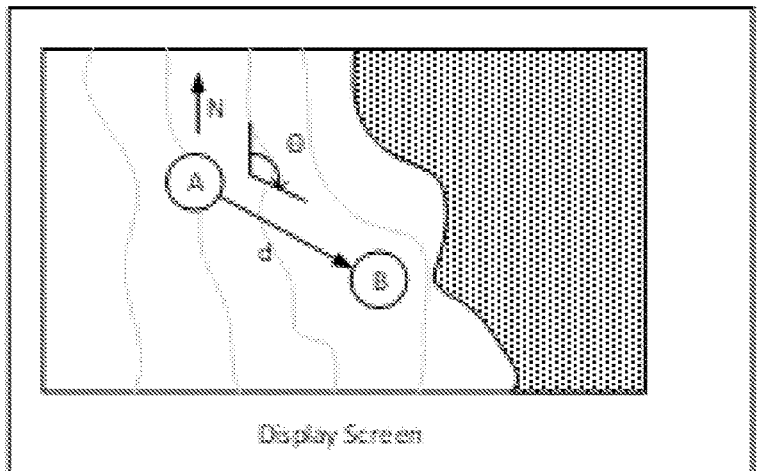
FIG. 20 depicts an anchoring jog display of a vehicle control system.
Figure 21:
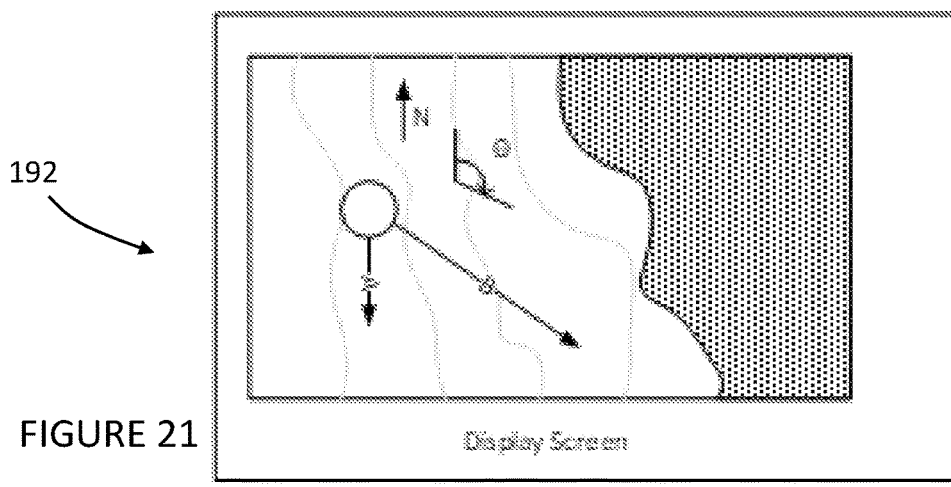
FIG. 21 depicts a vectoring jog display of a vehicle control system.
Figure 22:
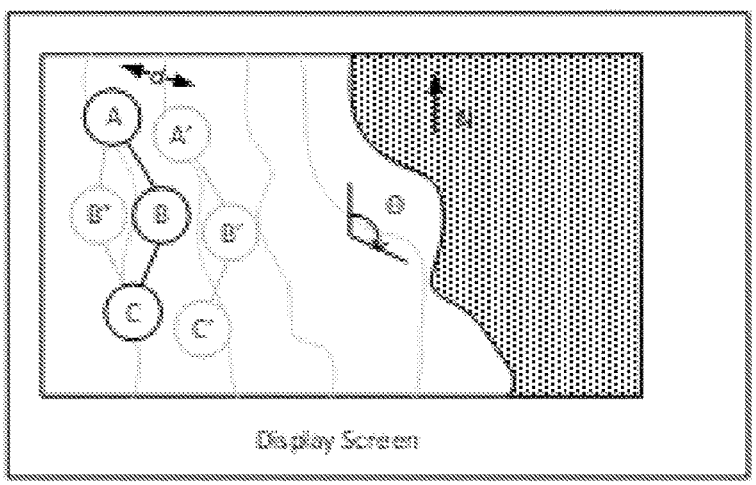
FIG. 22 depicts a routes adjustment display of a vehicle control system.

Although not limited to these on-screen graphics, FIG. 20-22 illustrate some embodiments of the graphics (visual representations) for display on a display screen (i.e. 124B) when in various modes of the devices disclosed herein. For example, FIG. 20 is an on-screen visual representation of an anchoring jog display 190. In this embodiment, 'A' depicts the initial (current) location. 'B' depicts the updated location for display (where the vehicle will travel), 'θ' is the yaw angle received from the GSD, and 'd' is the calculated distance and direction using GSD provided data (d' is proportional to roll or pitch and maximum/minimum limits).

FIG. 21 is an on-screen visual representation of a vectoring jog display 192. 'A' depicts the initial (current) vector whereby line length is proportional to speed. 'B' depicts the updated vector (the direction and speed the controlled vehicle will travel). Line angle is determined by the yaw of the GSD, and is referenced globally. The line 'B' is displayed longer for higher desired thrust. The magnitude of thrust in this embodiment is determined by increasing the pitch or roll of the GSD as previously illustrated in FIG. 5.

FIG. 22 is an on-screen visual representation of a routes adjustment display 194. The path (ABC) represents the initial route of the controlled vehicle on the display. (A'B'C') is the adjusted entire route. (AB"C) is the route where (B) is adjusted to (B"). Adjustment can be implemented by a yaw movement of the GSD in the direction pointing the direction of jog, and optionally a secondary roll and/or pitch gesture. In some embodiments, adjustments can also be solely a roll gesture indicating the direction of jog.

Figure 23:
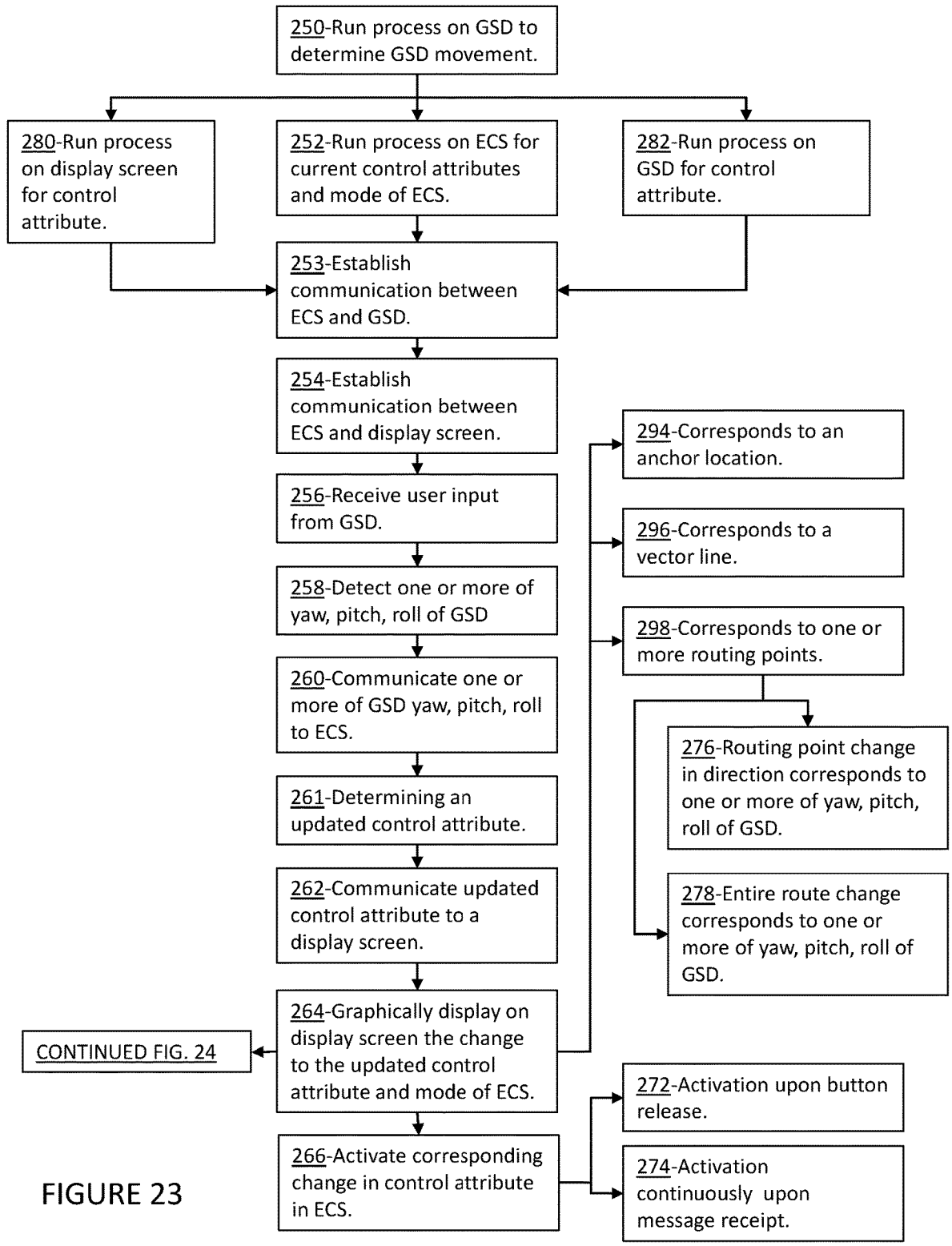
FIG. 23 depicts the graphical flow of a method of providing input to a controller and corresponding graphics on a display screen of a vehicle control system.
Figure 24:
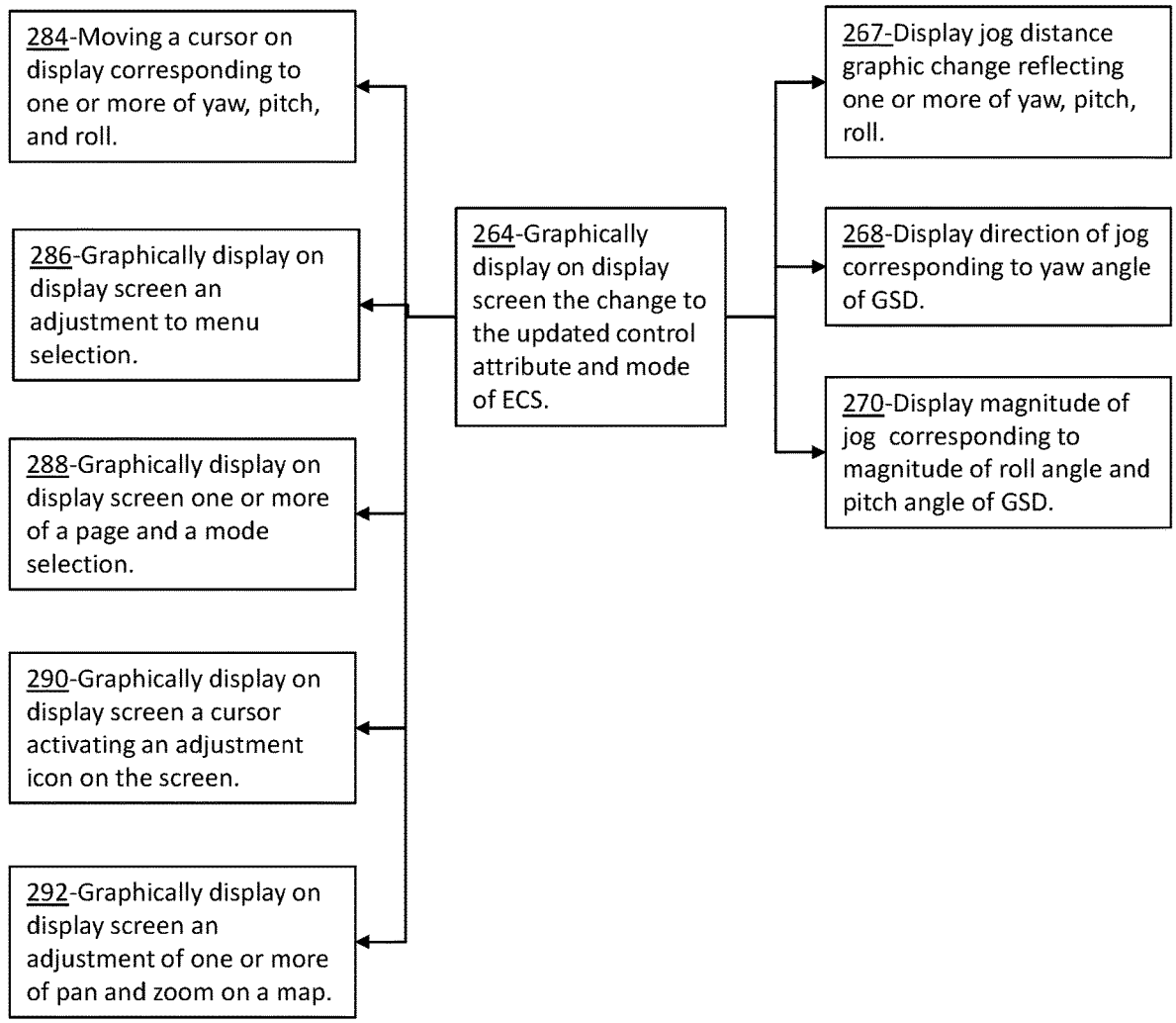
FIG. 24 depicts additional graphical flow of the method in FIG. 23.

FIGS. 23-24 illustrates one embodiment of a method of using a gesture sensing device to provide input to an electronic control system (i.e. 102B) and the corresponding graphics on a display screen (i.e. 124B) of a vehicle control system (i.e. 100B). The method comprises the following steps which as one skilled in the art will recognize, can in some instances rearranged in order. Running a process on a gesture sensing device to determine one or more of yaw, pitch and roll of the gesture sensing device 250. Running a process on an onboard electronic control system (ECS) to determine the current (initial) control attributes and mode of the vehicle control system 252. In alternative embodiments, the step of running the process for determining the current control attributes is run on a display screen in the ECS 280, or as yet another alternative, the step of running the process for determining the current control attributes is run on a GSD in the VCS 282 (i.e. 100B). Establishing one or more of wired and wireless communication between the ECS and GSD 253. Establishing one or more of wired and wireless communication between the onboard electronic control system and a display screen 254. Receiving user input as a result of specific movements of the GSD 256. Detecting one or more of yaw, pitch, and roll through sensors in the GSD 258. Communicating the one or more of yaw, pitch, and roll changes of the GSD 260 to the ECS and processing this data for determining an updated control attribute of the ECS 261. Communicating the updated control attribute of the control system to a display screen 262. Graphically displaying on the display screen the corresponding change to the updated control attribute and mode of the electronic control system 264. Activating the corresponding change in control attribute in the electronic control system 266. In some embodiments, activation of an updated control attribute comprises the step releasing a button on the GSD 272. Alternatively, activation of an updated control attribute comprises the step of continuous activation upon receipt of the message 274.

There are a variety of options for graphically displaying on the display screen the corresponding change to the updated control attribute and mode of the control system. In one some embodiments, this comprises the step of the corresponding change in graphic being the step of displaying jog distance from a current location reflecting one or more of yaw, pitch and roll of the GSD 267. In some embodiments, this graphic display comprises the step of the corresponding change in graphic being a displayed direction of jog, again reflecting one or more the yaw, pitch and roll of the GSD 268. In some embodiments, the graphic display of the corresponding change to the updated control attribute and mode of the control system comprises the step of the corresponding change in graphic being displayed as a magnitude of jog corresponding to one or more of magnitude of roll angle and magnitude of pitch angle of the GSD 270. In some embodiments, the corresponding change to the updated control attribute and mode of the control system further comprises the step of relating this change to an anchor location 294 being displayed corresponding to the control point and updated display point. Alternatively, the corresponding change to the updated control attribute and mode of the control system further comprises the step of relating this change to a vector line 296 being displayed corresponding to the control point and updated display point. As yet another alternative, the corresponding change to the updated control attribute and mode of the control system further comprises the step of relating this change to one or more routing points 298 being displayed corresponding to the control point and updated display information. In some embodiments, step 298 further comprises the step of the routing point change in direction corresponding to one or more of yaw, pitch, and roll of the GSD 276, whereas in other embodiments, step 298 further comprises the step of having the entire route change correspond to one or more of yaw, pitch, and roll of the GSD 278.

Additional step options for graphically displaying on the display screen the corresponding change to the updated control attribute and mode of the electronic control system are as follows. In some embodiments, this comprises the step of moving a cursor graphically corresponding to one or more of yaw, pitch, and roll 284. In some embodiments, this comprises the step of graphically displaying on the display screen an adjustment to a menu selection 286. In some embodiments, this comprises the step of graphically displaying on the display screen one or more of a page and a mode selection 288. In some embodiments, this comprises the step of graphically displaying on the display screen a cursor activating an adjustment icon on the screen 290. In some embodiments, this comprises the step of graphically displaying on the display screen an adjustment of one or more of pan and zoom on a map 292.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method of providing controller input and corresponding graphics on a display screen of a vehicle control system comprising the steps of:
    utilizing a central processing unit on a gesture sensing device (GSD) to determine one or more of yaw, pitch and roll of the gesture sensing device based on input from a directional device on the GSD;
    utilizing the processor of a vehicle control system to determine control attributes and mode of the electronic vehicle control system;
    establishing one or more of wired and wireless communication between the onboard electronic control system and the gesture sensing device;
    establishing one or more of wired and wireless communication between the onboard electronic control system and a display screen;
    receiving a user input from the gesture sensing device;
    detecting a change of gesture in one or more of yaw, pitch and roll from the user;
    communicating the one or more of a current yaw, pitch and roll of the gesture sensing device to the onboard electronic control system and then processing to determine an updated control attribute of the electronic control system;
    communicating the updated control attribute of said control system to a display screen;
    graphically displaying on the display screen the corresponding change to the updated control attribute and mode of the control system; and
    activating the corresponding change in the control attribute in the electronic control system.

2. The method of claim 1 whereby the step of graphically displaying on the display screen the corresponding change to the updated control attribute and mode of the control system further comprises the step of the corresponding change in graphic being displayed as a jog distance reflecting one or more of yaw, pitch and roll movements of the GSD.

3. The method of claim 1 whereby the step of graphically displaying on the display screen the corresponding change to the updated control attribute and mode of the control system further comprises the step in the corresponding change in graphic being displayed as a direction of jog reflecting one or more of yaw, pitch and roll movements of the GSD.

4. The method of claim 1 whereby the step of graphically displaying on the display screen the corresponding change to the updated control attribute and mode of the control system further comprises the step in the corresponding change in graphic being displayed as a magnitude of jog distance from a current location reflecting one or more of the magnitude of change of the roll angle and magnitude of change of the pitch angle of the gesture sensing device.

5. The method of claim 1 further comprising the step of releasing a button on the GSD to activate updating of the control attribute.

6. The method of claim 1 further comprising the step of continuously activating the updated control attribute upon each message being received.

7. The method of claim 1 whereby the step of graphically displaying on the display screen the corresponding change to the updated control attribute and mode of the control system further comprises the step of an anchor location being displayed corresponding to the control point and updated display point.

8. The method of claim 1 whereby the step of graphically displaying on the display screen the corresponding change to the updated control attribute and mode of the control system further comprises the step of a vector line being displayed corresponding to the control point and updated display point.

9. The method of claim 1 whereby the step of graphically displaying on the display screen the corresponding change to the updated control attribute and mode of the control system further comprises the step of one or more routing points being displayed corresponding to the control point and updated display information.

10. The method of claim 1 further comprising the step of the selected routing point adjusting in a direction from the initial location and corresponding to the one or more of yaw, pitch and roll of the gesture sensing device.

11. The method of claim 1 further comprising the step of the entirety of a route displayed being adjusted corresponding to one or more of yaw, pitch and roll of the gesture sensing device.

12. The method of claim 1 further comprising the step of the updated control attribute being determined by a process performed in the central processing unit in the electronic control system.

13. The method of claim 1 further comprising the step of the updated control attribute being determined by a process performed in the central processing unit in the display screen.

14. The method of claim 1 further comprising the step of the updated control attribute being determined by a process performed in the central processing unit in the gesture sensing device.

15. A method of controlling graphics on a display screen comprising the steps of:
    utilizing a central processing unit to determine one or more of yaw, pitch and roll of a gesture sensing device (GSD) based on input from one or more directional devices on the GSD;
    starting a display unit to communicate status of various modes of the vehicle control system;
    establishing one or more of wired and wireless communication between an onboard electronic control system and a gesture sensing device;

establishing one or more of wired and wireless communication between the onboard electronic control system and the display screen;

receiving a user input on the gesture sensing device;

detecting a change of gesture in one or more of yaw, pitch and roll from the user;

communicating one or more of the current yaw, pitch and roll of the gesture sensing device;

determining an updated control point of said control system;

displaying a corresponding change in a graphic on the display screen to the updated control attribute and mode of said control system; and activating the corresponding change in attribute in said control system.

16. The method of claim 15 further comprising the step of moving a cursor on the display corresponding to one or more of yaw, pitch and roll of the GSD.

17. The method of claim 15 further comprising the step of illuminating a graphic on the display screen depicting an adjustment in a menu selection.

18. The method of claim 15 further comprising the step of illuminating a graphic on the display screen depicting a page or mode selection.

19. The method of claim 15 further comprising the step of illuminating a graphic on the display screen depicting a cursor activating an adjustment.

20. The method of claim 15 further comprising the step of illuminating a graphic on the display screen representing an adjustment of one or more of the pan and zoom of a map.

* * * * *